United States Patent
Hoshina et al.

(10) Patent No.: US 11,228,031 B2
(45) Date of Patent: Jan. 18, 2022

(54) ELECTRODE, SECONDARY BATTERY, BATTERY PACK, AND VEHICLE

(71) Applicant: KABUSHIKI KAISHA TOSHIBA, Minato-ku (JP)

(72) Inventors: Keigo Hoshina, Yokohama (JP); Yasunobu Yamashita, Tokyo (JP); Wen Zhang, Sagamihara (JP); Yasuhiro Harada, Isehara (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 141 days.

(21) Appl. No.: 16/810,916

(22) Filed: Mar. 6, 2020

(65) Prior Publication Data
US 2021/0083278 A1 Mar. 18, 2021

(30) Foreign Application Priority Data
Sep. 17, 2019 (JP) .............................. JP2019-168499

(51) Int. Cl.
*H01M 4/485* (2010.01)
*H01M 10/42* (2006.01)
(Continued)

(52) U.S. Cl.
CPC ............. *H01M 4/485* (2013.01); *B60L 50/64* (2019.02); *H01M 10/0525* (2013.01);
(Continued)

(58) Field of Classification Search
None
See application file for complete search history.

(56) References Cited

U.S. PATENT DOCUMENTS 9,425,481 B2 8/2016 Nishi et al.
2017/0077494 A1 3/2017 Iwasaki et al.

FOREIGN PATENT DOCUMENTS

JP 2017-059394 A 3/2017
WO WO 2018/020668 A1 2/2018

OTHER PUBLICATIONS

Abramoff, et al., "Image Processing with ImageJ", reprinted from the Jul. 2004 issue of Biophotonics International copyrighted by Laurin Publishing Co., Inc., 2004, 7 pages.
(Continued)

*Primary Examiner* — Wyatt P McConnell
(74) *Attorney, Agent, or Firm* — Oblon, McClelland, Maier & Neustadt, L.L.P.

(57) ABSTRACT

According to one embodiment, an electrode includes a current collector and an active material-containing layer. The active material-containing layer contains a titanium-niobium composite oxide. A cross-section of the active material-containing layer includes a first cross-section from the current collector to length 0.5t with respect to a thickness t of the active material-containing layer, and a second cross-section from length 0.5t to length t from the current collector. An area ratio S1 occupied by the titanium-niobium composite oxide within the first cross-section, and an area ratio S2 occupied by the titanium-niobium composite oxide within the second cross-section satisfy 0.8<S2/S1<1. A maximum peak in a particle diameter frequency distribution of the titanium-niobium composite oxide is from 0.5 μm to 3 μm.

13 Claims, 7 Drawing Sheets

(51) Int. Cl.
*H01M 10/0525* (2010.01)
*B60L 50/64* (2019.01)
H01M 4/02 (2006.01)
B60K 1/04 (2019.01)
B60L 7/10 (2006.01)
B60K 6/28 (2007.10)

(52) U.S. Cl.
CPC .............. *H01M 10/425* (2013.01); *B60K 1/04* (2013.01); *B60K 6/28* (2013.01); *B60L 7/10* (2013.01); *B60Y 2200/91* (2013.01); *B60Y 2200/92* (2013.01); *B60Y 2400/112* (2013.01); *H01M 2004/021* (2013.01); *H01M 2004/027* (2013.01); *H01M 2010/4271* (2013.01); *H01M 2220/20* (2013.01)

(56) References Cited

OTHER PUBLICATIONS

Nakai et al., "Funmatsu X sen Kaiseki no Jissai (Reality of Powder X-Ray Analysis)", X-Ray Analysis Investigation Conversazione, The Japan Society for Analytical Chemistry, 2002, 59 pages (with English Machine Translation).

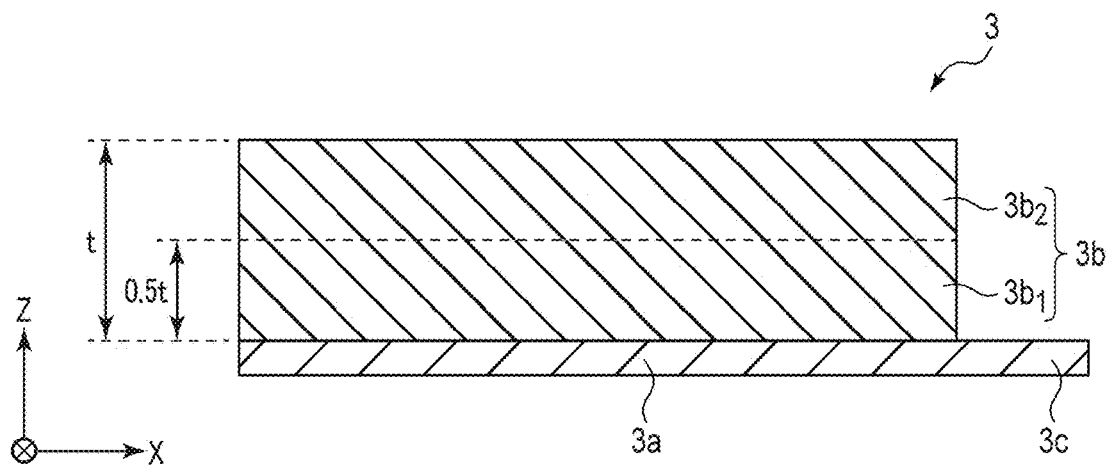
F I G. 1
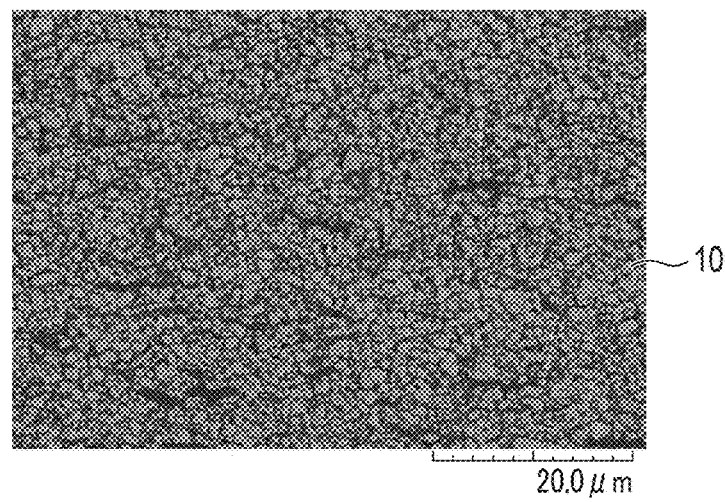
F I G. 2
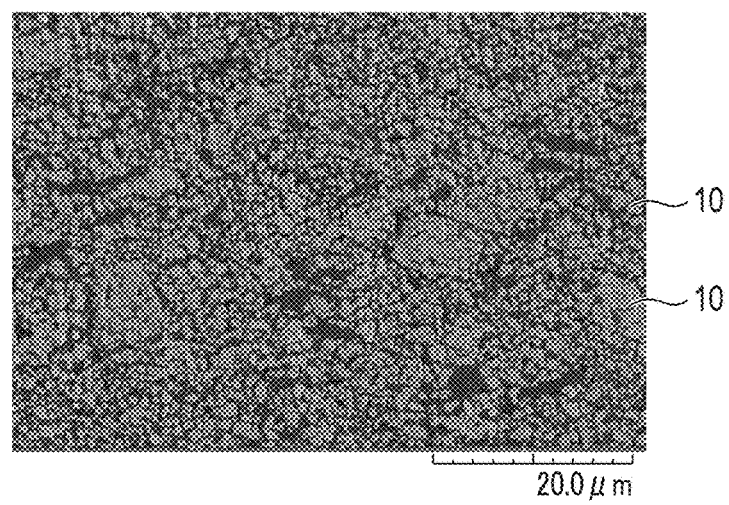
F I G. 3

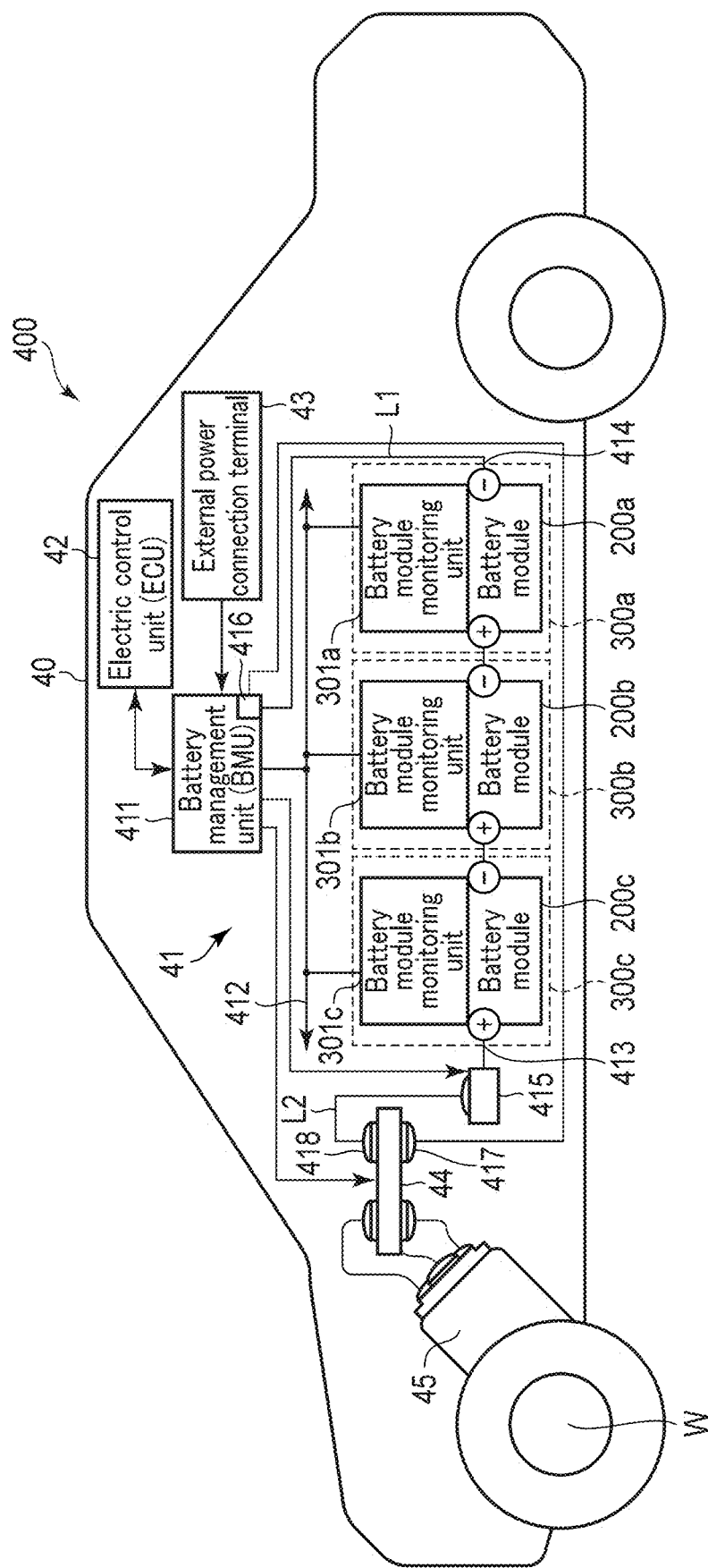
F I G. 12

ELECTRODE, SECONDARY BATTERY, BATTERY PACK, AND VEHICLE

CROSS-REFERENCE TO RELATED APPLICATION

This application is based upon and claims the benefit of priority from Japanese Patent Application No. 2019-168499, filed Sep. 17, 2019, the entire content of which is incorporated herein by reference.

FIELD

Embodiments relate to an electrode, secondary battery, battery pack, and vehicle.

BACKGROUND

Secondary batteries, nonaqueous electrolyte batteries in particular, are anticipated for use in middle to large scale power sources such as on-board applications and stationary applications, in addition to use as power sources for small-sized electronic devices. In particular for middle to large scale use, high energy density, input-output performance, and life performance is in demand.

Prevention of side reactions of an electrolyte solution on an electrode surface is an effective way to obtain excellent life performance. For example, side reactions can be suppressed by forming a film on the electrode surface. However, if a stable film is formed in order to prevent excessive decomposition of an electrolyte solution, resistance of the film becomes great, giving rise to concern of degradation of input-output performance and cycle performance. Another technique is to coat an electrode active material with an inorganic material or an organic material. However, when the degree of coating is high, diffusion of lithium becomes hindered at the coated sections, raising concern to degradation of input-output performance and cycle performance.

BRIEF DESCRIPTION OF THE DRAWINGS

FIG. 1 is a cross-sectional view schematically showing an example of an electrode according to an embodiment;

FIG. 2 is a scanning electron micrograph showing a part of a first cross-section of an active material-containing layer in an example of an electrode according to an embodiment;

FIG. 3 is a scanning electron micrograph showing a part of a second cross-section of an active material-containing layer in an example of an electrode according to an embodiment;

FIG. 12 is a diagram schematically showing an example of a control system related to an electric system in the vehicle according to an embodiment.

DETAILED DESCRIPTION

Figure 4:
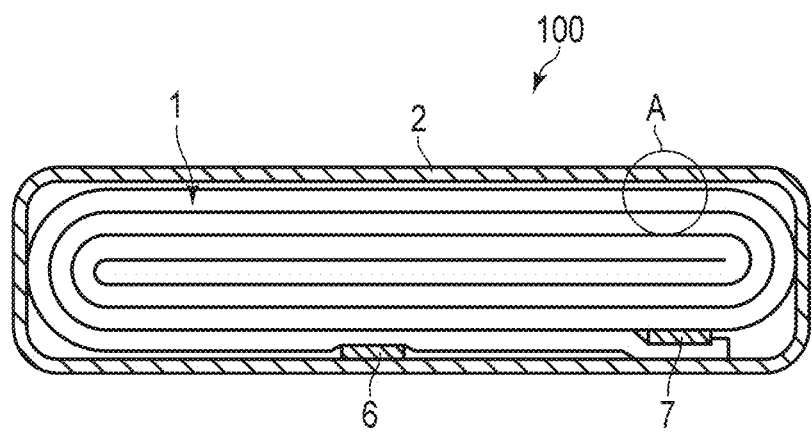
FIG. 4 is a cross-sectional view schematically illustrating an example of a secondary battery according to an embodiment.

According to one embodiment, provided is an electrode including a current collector and an active material-containing layer disposed on the current collector. The active material-containing layer contains a titanium-niobium composite oxide. A cross-section of the active material-containing layer along a stacking direction of the current collector and the active material-containing layer includes a first cross-section and a second cross-section. The first cross-section corresponds to a first thickness region ranging from the current collector to length 0.5t with respect to a thickness t of the active material-containing layer along the stacking direction. The second cross-section corresponds to a second thickness region ranging along the stacking direction from length 0.5t to length t from the current collector. An area ratio S1 occupied by the titanium-niobium composite oxide within the first cross-section, and an area ratio S2 occupied by the titanium-niobium composite oxide within the second cross-section satisfy a relationship $0.8<S2/S1<1$. A peak-top position of a maximum peak in a particle diameter frequency distribution of particles of the titanium-niobium composite oxide in the cross-section is within a range of from 0.5 μm to 3 μm.

According to another embodiment, provided is a secondary battery including a negative electrode, a positive electrode, and an electrolyte. The negative electrode includes the electrode according to the above embodiment.

According to a further other embodiment, provided is a battery pack including the secondary battery according to the above embodiment.

According to still another embodiment, provided is a vehicle including the battery pack according to the above embodiment.

Hereinafter, embodiments will be described with reference to the drawings. The same reference signs are applied to common components throughout the embodiments and overlapping explanations are omitted. Each drawing is a schematic view for explaining the embodiment and promoting understanding thereof; though there may be differences in shape, size and ratio from those in an actual device, such specifics can be appropriately changed in design taking the following explanations and known technology into consideration.

[First Embodiment]

According to a first embodiment, an electrode is provided. The electrode includes a current collector and an active material-containing layer on the current collector. The active material-containing layer contains a titanium-niobium composite oxide. An area ratio S1 that is occupied by the titanium-niobium composite oxide within a first cross-section, and an area ratio S2 that is occupied by the titanium-niobium composite oxide within the second cross-section satisfy a relationship $0.8<S2/S1<1$. The first cross-section corresponds to a portion, among a cross-section of the active material-containing layer along a stacking direction of the current collector and the active material-containing layer, of a first thickness region ranging up to a first thickness position at length 0.5t from the current collector relative to a thickness t of the active material-containing layer along the stacking direction. The second cross-section corresponds to a portion, among the cross-section of the active material-containing layer, of a second thickness region ranging from the first thickness position at length 0.5t to a second thickness position at length t from the current collector along the stacking direction relative to the thickness t. A peak-top position of a maximum peak in a particle diameter frequency distribution of particles of the titanium-niobium composite oxide in the cross-section is within a range of from 0.5 μm to 3 μm.

The electrode according to the embodiment may be an electrode for a battery. The battery, for which the electrode is used, may be a secondary battery such as a lithium secondary battery, for example. The secondary battery as described herein includes nonaqueous electrolyte secondary batteries containing nonaqueous electrolyte(s). As a specific example, the electrode may be an electrode for a nonaqueous electrolyte battery, having an active material-containing layer (electrode layer) disposed on a foil-shaped current collector (current collector foil).

The active material-containing layer is disposed on at least one principal surface of the current collector. For example, the active material-containing layer may be disposed on one principal surface of the current collector. Alternatively, the active material-containing layer may be disposed on two principal surfaces of the current collector, for example, both of reverse surfaces of the current collector having a foil shape. The current collector and the active material-containing layer may configure an electrode. This electrode may be, for example, a negative electrode.

The current collector may have a surface including a portion provided with no active material-containing layer formed thereon. This portion can serve as a current collecting tab.

The active material-containing layer contains a titanium-niobium composite oxide as an electrode active material. In addition to the electrode active material, the active material-containing layer may further include, for example, an electro-conductive agent and a binder. When a cross-sectional image of the active material-containing layer cut along the stacking direction of the current collector and the active material-containing layer captured with a scanning electron microscope (SEM) is binarized to classify components within the active material-containing layer into titanium-niobium composite oxide and other elements, S1 and S2 satisfy 0.8<S2/S1<1. Here, S1 is an area ratio occupied by the titanium-niobium composite oxide within a first cross-section corresponding to a first thickness region ranging from the current collector to a length 0.5t with respect to a thickness t of the active material-containing layer, and S2 is an area ratio occupied by the titanium-niobium composite oxide within a second cross-section corresponding to a second thickness region ranging from the length 0.5t from the current collector to a length t. The thickness t represents a thickness along the stacking direction of the current collector and the active material-containing layer. In other words, relative to the area ratio S1 of the titanium-niobium composite oxide in the cross-section of the half of the active material-containing layer at the side of the current collector, the area ratio S2 of the titanium-niobium composite oxide in the cross-section of the other half of the active material-containing layer is smaller. Moreover, a ratio of S2 to S1 (S2/S1) is in a range of 0.8<S2/S1<1.

Included in portions other than the titanium-niobium composite oxide sorted out by the binarization are, for example, active material(s) other than the titanium-niobium composite oxide, electro-conductive agent(s), binder(s), gap(s) and vacancy(s). The other active material(s), the electro-conductive agent(s) and the binders) will be described later in detail.

In an electrode provided with an active material-containing layer on both sides of a current collector, the aforementioned relationship of S2/S1 is satisfied in each cross-section of the active material-containing layers disposed on faces of the front and reverse sides of the current collector. In this case, when viewing the electrode as a whole including the current collector and the active material-containing layers on both sides, the current collector can be regarded as the center, the inner halves of the active material-containing layers can be considered as corresponding to the first thickness region, and the outer halves of the active material-containing layers can be considered as corresponding to the second thickness region.

In a particle diameter frequency distribution of titanium-niobium composite oxide particles in the cross-section of the active material-containing layer, a peak-top position of a maximum peak is within a range of 0.5 μm to 3 μm. The maximum peak, as referred to herein, represents a peak having a peak intensity that is highest within a spectrum indicating the particle diameter frequency distribution of the titanium-niobium composite oxide particles in the active material-containing layer. In other words, in the particle diameter frequency distribution of the titanium-niobium composite oxide particles contained in the active material-containing layer, the particle diameter present at highest frequency is from 0.5 μm to 3 μm. The peak-top position of the maximum peak in the distribution spectrum corresponds to a mode diameter of the titanium-niobium composite oxide particles and may correspond to an average primary particle diameter.

The titanium-niobium composite oxide contained in the active material-containing layer as an electrode active material expands and contracts, in accordance with charge and discharge of a battery provided with the electrode configured therein. Accordingly, in a region within the active material-containing layer with lots of charge and discharge reactions, there is much expansion and contraction of the titanium-niobium composite oxide, which causes cracks in the active material-containing layer or cracks in the titanium-niobium composite oxide itself. Furthermore, due to the expansion and contraction, a distance between the titanium-niobium composite oxide particles increases, which may disconnect electro-conductive paths within the active material-containing layer. In a battery, an active material-containing layer may face a counter electrode. Within the active material-containing layer, compared to a region at a side of the current collector (for example, the first thickness region), a region at a side closer to the counter electrode (for example, the second thickness region) more readily participates in charge and discharge reactions. It is a matter of course that more charge and discharge reactions occur in a region with a greater amount of titanium-niobium composite oxides as electrode active material.

In the electrode according to the embodiment, S1 and S2 satisfy 0.8<S2/S1<1, where S1 is the area ratio occupied by the titanium-niobium composite oxide in the cross-section for the half closer to the current collector, and S2 is the area ratio S2 occupied by the titanium-niobium composite oxide in the cross-section for the half on the side that could face the counter electrode. In other words, compared with an amount of the titanium-niobium composite oxide(s) contained in the region closer to the current collector, an amount of the titanium-niobium composite oxide is less in the region that becomes closer to the counter electrode when the active material-containing layer faces the counter electrode, and which therefore more readily contributes to charge and discharge reactions. As described above, since a distribution of the titanium-niobium composite oxide in the active material-containing layer is biased such that there is more of the titanium-niobium composite oxide in vicinity of the current collector where charge and discharge reactions are less likely to occur, and less of the titanium-niobium composite oxide in a section closer to the counter electrode where charge and discharge reactions are likely to occur, a distribution of the charge and discharge reactions is uniform in view of the active material-containing layer as a whole. Since the ratio S2/S1 between the area ratio S1 and the area ratio S2 of the titanium-niobium composite oxide in the respective regions of the active material-containing layer exceeds 0.8, the titanium-niobium composite oxide does not concentrate near the current collector. Since the ratio S2/S1 is less than 1, the titanium-niobium composite oxide does not concentrate on the surface of the active material-containing layer on the side opposite to the current collector. When the ratio S2/S1 is 0.8 or less, the titanium-niobium composite oxide concentrates on the side of the active material-containing layer closer to the current collector, whereby concentration of charge and discharge reactions facilitate occurrence of cracks on the side closer to the current collector. On the other hand, when the ratio S2/S1 is 1 or more, the charge and discharge reactions concentrate on the surface that faces the counter electrode, where charge and discharge more readily occur, in the first place. Accordingly, a reaction distribution hardly becomes uniform.

By virtue of the peak-top of the maximum peak in the particle diameter frequency distribution of the titanium-niobium composite oxide particles in the active material-containing layer being positioned within the range of 0.5 μm to 3 μm, electro-conductive paths within the active material-containing layer can be maintained even if charge and discharge is repeated, and charge and discharge reactions within the active material-containing layer can be made more uniform. Among the titanium-niobium composite oxide particles, main particles have a particle diameter of from 0.5 μm to 3 μm, which is not too small and not too large. When the titanium-niobium composite oxide particles have a particle diameter large enough to make the position of the peak-top be 0.5 μm or more, effects on the active material-containing layer due to the expansion and contraction of the particles is little, and thereby electro-conductive paths can be maintained. When the particle diameter of the titanium-niobium composite oxide particles is limited so as to make the position of the peak-top be 3 μm or less, local concentration of the charge and discharge reactions can be avoided. The titanium-niobium composite oxide is preferably contained in the active material-containing layer in the form of primary particles. More preferably, the titanium-niobium composite oxide contained in the active material-containing layer is in the form of primary particles having an average primary particle diameter of from 0.5 μm to 3 μm.

The active material-containing layer may include gaps. In the active material-containing layer, it is preferable that a relation of A>B is satisfied, where A represents a pore diameter corresponding to a maximum peak in a pore diameter distribution in a third thickness region that includes the first thickness region and the second thickness region, and B represents a pore diameter corresponding to a maximum peak in a pore diameter distribution in the first thickness region. The third thickness region is a combination of the first thickness region and the second thickness region. In other words, the third thickness region corresponds to the whole region of the active material-containing layer. Accordingly, the pore diameter A being larger than the pore diameter B indicates that a diameter of main pores contained in view of the whole active material-containing layer is larger than a diameter of main pores contained in the half closer to the current collector. In short, the side closer to the current collector has more small pores. In other words, a diameter of pores in a section of the active material-containing layer far from the current collector is larger, and a distance between titanium-niobium composite oxide particles in this section is longer. Since the titanium-niobium composite oxide particles are more sparsely dispersed in the region where the charge and discharge reactions are likely to occur, it is possible to reduce generation of cracks in the active material-containing layer more reliably.

In addition, in an electrode used for a battery including a liquid electrolyte, vacancies and gaps in the active material-containing layer may be impregnated with the liquid electrolyte (electrolyte solution). In a battery that charges and discharges with movement of carrier ions between electrodes, by virtue of the pore diameter A and the pore diameter B satisfying the relationship A>B, the carrier ions can more readily diffuse from a surface facing a counter electrode to a section of the active material-containing layer near the current collector through an electrolyte solution. Accordingly, charge and discharge reactions within the active material-containing layer can be made further uniform.

The pore diameter distribution in the third thickness region and the pore diameter distribution in the first thickness region can be obtained by mercury porosimetry. The maximum peak in each pore diameter distribution is a peak having the highest peak intensity in the respective pore diameter distribution spectrum. The position of peak-top of the maximum peak in each spectrum respectively correspond to the pore diameter A and the pore diameter B. A pore diameter ratio A/B of the pore diameter A to the pore diameter B may be, for example, within a range of 0.9<A/B<2. A method for measuring the pore diameter distribution according to mercury porosimetry will be described later in detail.

With reference to FIGS. 1 to 3, the electrode according to the embodiment will be described.

FIG. 1 is a cross-sectional view schematically showing an example of the electrode according to the embodiment. The example shown in FIG. 1 illustrates an aspect of the electrode as a negative electrode of a battery. FIG. 1 is a cross-sectional view of a negative electrode 3 cut along the XZ plane perpendicular to the X direction, which is the short-side direction or the long-side direction of the negative electrode 3, and the Z direction, which is the thickness direction thereof.

The negative electrode 3 shown in FIG. 1 includes a negative electrode current collector 3a and a negative electrode active material-containing layer 3b disposed on the negative electrode current collector 3a. The negative electrode current collector 3a includes a portion that does not support the negative electrode active material-containing layer 3b thereon, which is referred to as a negative electrode current collecting tab 3c. The negative electrode active material-containing layer 3b includes a first thickness region $3b1$ and a second thickness region $3b_2$ arranged in order in the Z direction, namely, the thickness direction along the stacking direction of the negative electrode current collector 3a and the negative electrode active material-containing layer 3b. The first thickness region $3b_1$ corresponds to a section of the negative electrode active material-containing layer 3b, ranging from the negative electrode current collector 3a to length 0.5t of the thickness t in the Z direction. The second thickness region 3b2 corresponds to a section of the negative electrode active material-containing layer 3b, ranging along the Z direction from a first position at length 0.5t to a second position at length t relative to the thickness t from the negative electrode current collector 3a. In other words, the negative electrode current collector 3a, the first thickness region 3b1, and the second thickness region $3b_2$ are arranged in this order in the thickness direction of the negative electrode active material-containing layer 3b, and the first thickness region $3b_1$ is sandwiched between the negative electrode current collector 3a and the second thickness region 3b2.

In FIG. 1, the section depicted as the first thickness region $3b_1$ corresponds to the first cross-section, in the cross-section of the negative electrode active material-containing layer 3b cut along the stacking direction of the negative electrode current collector 3a and the negative electrode active material-containing layer 3b. The section depicted as the second thickness region $3b_2$ corresponds to the second cross-section in the cross-section of the negative electrode active material-containing layer 3b. The area ratio S1 is an area ratio among the first cross-section that is occupied by titanium-niobium composite oxide. The area ratio S2 is an area ratio among the second cross-section that is occupied by titanium-niobium composite oxide. The area ratio S1 and the area ratio S2 satisfy the relationship 0.8<S2/S1<1.

A peak-top position of the maximum peak in a particle diameter frequency distribution of titanium-niobium composite oxide particles contained in the cross-section of the negative electrode active material-containing layer 3b is in a range of 0.5 μm to 3 μm. This particle diameter frequency distribution is a distribution spanning the whole cross-section including both the first cross-section and the second cross-section.

FIG. 1 illustrates an example where the negative electrode active material-containing layer 3b is disposed only on one side of the negative electrode current collector 3a, but an active material-containing layer may be disposed on both faces on front and back sides of a current collector. On any face, a first thickness region is disposed between a current collector and a second thickness region.

FIG. 2 is a scanning electron micrograph showing a part of a first cross-section of an active material-containing layer in an example of the electrode according to the embodiment FIG. 2 shows, for example, a part of the cross-section in an electrode similar to the negative electrode 3 of the example shown in FIG. 1, corresponding to the first thickness region 3b1, cut along the stacking direction of the current collector and the active material-containing layer. FIG. 3 is a scanning electron micrograph showing a part of a second cross-section of an active material-containing layer in an example of the electrode according to the embodiment. FIG. 3 shows, for example, a part of the cross-section in an electrode similar to the negative electrode 3 of the example shown in FIG. 1, corresponding to the second thickness region 3b2, cut along the stacking direction of the current collector and the active material-containing layer. As shown in FIG. 2, in the first cross-section, elements other than titanium-niobium composite oxide particles 10, which include other members such as an electro-conductive agent and a binder, as well as gaps, are shown as dark images between the titanium-niobium composite oxide particles 10, but a proportion of such other elements is relatively small. As shown in FIG. 3, a proportion of elements other than the titanium-niobium composite oxide particles 10 is higher in the second cross-section than in the first cross-section. Accordingly, a ratio of occupancy by the titanium-niobium composite oxide particles 10 in the area of the first cross-section (area ratio S1) is larger than a ratio of occupancy by the titanium-niobium composite oxide particles 10 in the area of the second cross-section (area ratio S2). In other words, a distribution of the titanium-niobium composite oxide particles 10 is denser in the first cross-section shown in FIG. 2 than in the second cross-section shown in FIG. 3.

The titanium-niobium composite oxide contained in the active material-containing layer may include a titanium-niobium composite oxide having a monoclinic crystal structure. An example of titanium-niobium composite oxide of the monoclinic structure includes a compound represented by $Li_aTi_{1-x}M1_xNb_{2-y}M2_yO_{7-\delta}$. In general formula $Li_aTi_{1-x}M1_xNb_{2-y}M2_yO_{7-\delta}$, subscript a is within a range of $0 \le a < 5$, subscript x is within a range of $0 \le x < 1$, subscript y is within a range of $0 \le y < 1$, and subscript δ is within a range of $-0.3 \le \delta \le 0.3$. Elements M1 and M2 are respectively at least one selected from the group consisting of Fe, Ni, W, Ta, and Mo. Elements M1 and M2 are elements that are the same or different from one another. It is preferable to include the above $Li_aTi_{1-x}M1_xNb_{2-y}M2_yO_{7-\delta}$ as titanium-niobium composite oxide.

The titanium-niobium composite oxide may include a titanium-niobium composite oxide having an orthorhombic crystal structure. An example of titanium-niobium composite oxide of the orthorhombic structure includes a compound represented by $Li_{2+s}Na_{2-t}M3_uTi_{6-v-w}Nb_vM4_wO_{14-\sigma}$. In general formula $Li_{2-s}Na_{2-t}M3_uTi_{6-v-w}Nb_vM4_wO_{14+\sigma}$, subscript s is within a range of $0 \le s \le 4$, subscript t is within a range of $0 < t < 2$, subscript u is within a range of $0 \le u < 2$, subscript v is within a range of $0 < v < 6$, subscript w is within a range of $0 \le w < 3$, a sum of the subscript v and the subscript w is within a range of $0 < v + w < 6$, subscript σ is within a range of $-0.5 \le \sigma \le 0.5$. Element M3 is at least one selected from the group consisting of Cs, K, Sr, Ba and Ca. Element M4 is at least one selected from the group consisting of Zr, Sn, V, Ta, Mo, W, Fe, Mn and Al.

The active material-containing layer may contain a single species of titanium-niobium composite oxide or may contain two or more species of titanium-niobium composite oxides. For example, an active material-containing layer may include both a monoclinic titanium-niobium composite oxide and an orthorhombic titanium-niobium composite oxide. In addition to a single species of titanium-niobium composite oxide or two or more species of titanium-niobium composite oxides, the active material-containing layer may contain another species of electrode active material or two or more species of other electrode active materials. Examples of other electrode active materials include lithium titanium oxide having a spinel structure (for example, lithium titanate represented by $Li_{4+z}Ti_5O_{12}$ where $0 \le z \le 3$), monoclinic titanium dioxide ($TiO_2$), anatase titanium dioxide, rutile titanium dioxide, hollandite titanium composite oxide and lithium titanium oxide having a ramsdellite structure. In particular, it is preferable to use lithium titanium oxide having a spinel structure in combination with titanium-niobium composite oxide(s). A content of titanium-niobium composite oxide(s) with respect to the total mass of an electrode active material including the titanium-niobium composite oxide(s) and other electrode active materials in the active material-containing layer is desirably from 50 mass % to 100 mass %.

The electro-conductive agent is added to improve current collection performance and to suppress contact resistance between the active material and the current collector.

Examples of the electro-conductive agent include carbonaceous substances such as vapor grown carbon fiber (VGCF), carbon blacks such as acetylene black, graphite, graphene, carbon nanofiber, and carbon nanotubes. One of these may be used as the electro-conductive agent, or two or more may be used in combination as the electro-conductive agent. Two or more carbonaceous substances are preferably used. Among the above carbonaceous substances, graphite and carbon nanofiber are preferable, since they allow an electrode of low resistance to be formed easily. Graphite and carbon nanofibers are more apt to become lodged between active material particles as compared to acetylene black or carbon black, providing electro-conductivity in the thickness direction of the active material-containing layer, whereby high input-output performance and favorable life performance can be obtained. Alternatively, instead of using an electro-conductive agent, a carbon coating or an electro-conductive inorganic material coating may be applied to the surface of the active material particle.

The binder is added to fill gaps among the dispersed active material and also to bind the active material with the current collector. Examples of the binder include polytetrafluoroethylene (PTFE), polyvinylidene fluoride (PVdF), fluorine rubber, styrene-butadiene rubber (SBR), acrylic polymers, acrylic copolymers, polyacrylate compounds such as polyacrylate and polyacrylonitrile, imide compounds, polyimide, polyamide imide, polyvinyl alcohol, urethane polymers, urethane copolymers, carboxymethyl cellulose (CMC), and salts of CMC. One of these may be used as the binder, or two or more may be used in combination as the binder.

The blending proportion of active material, electro-conductive agent and binder in the active material-containing layer may be appropriately changed according to the use of the electrode. For example, in the case of using the electrode as a negative electrode of a secondary battery, the active material (titanium-niobium composite oxide(s), or titanium-niobium composite oxide(s) and other electrode active material (s)), electro-conductive agent and binder in the active material-containing layer are preferably blended in proportions of 70% by mass to 96% by mass, 2% by mass to 28% by mass, and 2% by mass to 28% by mass, respectively. When the amount of electro-conductive agent is 2% by mass or more, the current collection performance of the active material-containing layer can be improved. Thereby, an output performance of large electrical current can be expected. When the amount of binder is 2% by mass or more, binding between the active material-containing layer and current collector is sufficient, and excellent cycling performances can be expected. On the other hand, an amount of each of the electro-conductive agent and binder is preferably 28% by mass or less, in view of increasing the capacity.

There may be used for the current collector, a material which is electrochemically stable at the potential (vs. Li/Li+) at which lithium (Li) is inserted into and extracted from the active material. For example, in the case where the active material is used as a negative electrode active material, the current collector is preferably made of copper, nickel, stainless steel, aluminum, or an aluminum alloy including one or more selected from the group consisting of Mg, Ti, Zn, Mn, Fe, Cu, and Si. The thickness of the current collector is preferably from 5 µm to 20 µm. The current collector having such a thickness can maintain balance between the strength and weight reduction of the electrode.

The current collector may include a portion where the active material-containing layer is not formed on a surface thereof. This portion may serve as an electrode current collecting tab.

The electrode may be produced by the following method, for example. First, active material, electro-conductive agent, and binder are suspended in a solvent to prepare a first slurry. A second slurry is prepared by suspending active material, electro-conductive agent, and binder with a blending proportion or composition that is different than that of the first slurry. The first slurry is applied onto one surface or both of reverse surfaces of a current collector. Next, the applied slurry is dried, and the second slurry is applied on top of the dried coat. The second slurry is dried to form a layered stack of active material-containing layer and current collector. Then, the layered stack is subjected to pressing. The electrode can be produced in this manner.

Alternatively, the electrode may be produced by the following method. First, active material, electro-conductive agent and binder are suspended in a solvent to prepare a first slurry. The first slurry is applied onto one side or both sides of a current collector. Next, the applied slurry is dried to obtain a stack of the current collector and a coat containing the active material. Then, the stack is pressed. Next, the first slurry is applied again onto the pressed coat. The reapplied slurry is dried to obtain a stack of the active material-containing layer and the current collector. Then, the stack is pressed again. A press pressure of the second press may be different from that of the first press. For example, the second press may be performed with a weaker pressure than the first press. In this manner, an electrode is produced.

When preparing the slurry, for example, a planetary centrifugal mixer may be used to mix materials such as the active material suspended in the solvent, so that the materials disperse uniformly. Alternatively, a beads mill may be used for mixing. Even when an active material in the form of secondary particles is added to a solution, using a beads mill for dispersion makes it possible to grind the secondary particles and thereby obtain a slurry that includes the active material in the form of primary particles.

(Measurement Methods)

Methods of measuring the electrode are described below.

When measuring an electrode that is configured into a battery, the electrode is taken out of the battery by the following procedure.

First, the battery is put into a discharged state. The discharged state as described herein refers to a state where the battery is subjected to a constant current discharge under a 25° C. environment at a current value of 0.2 C or less, to a discharge lower limit voltage. The battery put into the discharged state is placed into a glove box of inert atmosphere, for example, a glove box filled with argon gas. Next, within the glove box, the target electrode is taken out from the battery. Specifically, within the glove box, the exterior of the battery is cut open, taking care not to short-circuit the positive electrode with the negative electrode, just in case. From the cut-open battery, for example, the electrode connected to the negative electrode-side terminal is cut out, in the case that the electrode used as negative electrode is to be made the measurement sample. The electrode thus taken out is washed, for example, with an ethyl methyl ether solution, then dried.

<Cross-Sectional Measurement of Active Material-Containing Layer>

By subjecting the active material-containing layer of the electrode yielded by the aforementioned procedure to the following measurements, it is possible to obtain area ratios S1 and S2 of occupancy by titanium-niobium composite oxide in the cross-section of each of the thickness regions, a ratio of the area ratios S2/S1, and a particle diameter frequency distribution of titanium-niobium composite oxide particles.

Cross-sectional milling is performed on a part of the active material-containing layer of the electrode sample so as to expose a cross-section of the active material-containing layer. An ion milling device is used for the cross-sectional milling. The obtained cross-section is analyzed by scanning electron microscope-energy dispersive X-ray spectrometry (SEM-EDX). This analysis allows shapes of components contained in the active material-containing layer and compositions of the components contained in the active material-containing layer (each element from B to U in the periodic table) to be known. Accordingly, in an analysis image, it is possible to identify particles containing niobium and titanium as the titanium-niobium composite oxide particles.

Specifically, in order to identify the active material, the active material is observed by the following procedure, using a scanning electron microscope (SEM) and energy dispersive X-ray spectrometry (EDX) in combination.

A cross-section of the electrode to be measured is observed with the scanning electron microscope (SEM). Sampling is performed in an inert atmosphere such as argon or nitrogen to avoid exposure to the air. Several particles are randomly selected from SEM images at 3000-fold magnification. Here, particles are selected such that a particle diameter distribution of the selected particles becomes as wide as possible.

Next, elemental analysis is performed on each selected particle by energy dispersive X-ray spectrometry (EDX). Accordingly, it is possible to specify kinds and quantities of elements other than Li among the elements contained in each selected particle.

With regard to Li, inductively coupled plasma (ICP) emission spectrometry described below, offers information on the Li content in the entire active material. ICP emission spectrometry is performed according to the following procedure.

From the dried electrode, a powder sample is prepared in the following manner. The active material-containing layer is dislodged from the current collector and ground in a mortar. The ground sample is dissolved with acid to prepare a liquid sample. Here, hydrochloric acid, nitric acid, sulfuric acid, hydrogen fluoride, and the like may be used as the acid. The components included in the active material being measured can be found by subjecting the liquid sample to ICP analysis.

An area ratio occupied by titanium-niobium composite oxide is obtained based on binarization processing by image analysis. It is possible to employ, for example, image analysis software Image J (Dr. Michael et al., Image Processing with ImageJ, Reprinted from the July 2004 issue of Biophotonics International copyrighted by Laurin Publishing Co. INC.). First, trimming is performed to obtain an image of the section (first thickness region) from the current collector to length 0.5t of the thickness t along the stacking direction of the current collector and the active material-containing layer, among the active material-containing layer (the part corresponding to the first cross-section is trimmed out). Here, a trimming width in a direction perpendicular to the thickness direction of the electrode is 50 μm. Next, a threshold is set for dividing plural shading values into binary values in a luminance histogram. Here, an intermediate point between double peaks found in the histogram is set as a threshold. Then, binarization is performed to calculate areas of the titanium-niobium composite oxide and of other elements, thereby obtaining the area ratio S1.

Similarly, it is possible to obtain the area ratio S2 that the titanium-niobium composite oxide occupies in the cross-section (second cross-section) of the active material-containing layer in the section ranging from the length 0.5t to the length t (second thickness region). Based on the area ratios S1 and S2 obtained for each section, S2/S1 is calculated.

In order to obtain a particle diameter frequency distribution of titanium-niobium composite oxide particles in an active material-containing layer, first, a cross-section of the active material-containing layer (the whole cross-section including both the first cross-section and the second cross-section) is binarized. Then, regarding the longest part of each particle determined to be the titanium-niobium composite oxide as the particle diameter, the particle diameter frequency distribution is obtained.

The image analysis software Image J is software in the public domain. The version of Image J used herein is 1.52a.

In a case where the active material-containing layer contains electrode active materials other than the titanium-niobium composite oxide, by combining analysis by SEM-EDX, X-ray diffraction (XRD) measurement, and ICP measurement, distinction can be made between the titanium-niobium composite oxide and other electrode active materials. SEM-EDX enables rough determination of a distribution of elements in the active material-containing layer, and XRD enables determination of a crystal structure of materials contained in the active material-containing layer. The elements in the active material-containing layer can be quantified by ICP.

XRD measurement is performed within a measurement range where 2θ is from 5 degrees to 90 degrees, using CuKα ray as a radiation source. By this measurement, X-ray diffraction patterns of compounds contained in the selected particles can be obtained.

As an apparatus for X-ray diffraction measurement, SmartLab manufactured by Rigaku is used, for example. Measurement is performed under the following conditions:

X ray source: Cu target
Output: 45 kV, 200 mA
soller slit: 5 degrees in both incident light and received light
step width (2θ): 0.02 deg
scan speed: 20 deg/min
semiconductor detector: D/teX Ultra 250
sample plate holder: flat glass sample plate holder (0.5 mm thick)
measurement range: range of 5° 2θ 90°

When another apparatus is used, in order to obtain measurement results equivalent to those described above, measurement using a standard Si powder for powder X-ray diffraction is performed, and measurement is conducted with conditions where peak intensities and peak-top positions correspond to those obtained using the above apparatus.

Conditions of the XRD measurement is set, such that an XRD pattern applicable to Rietveld analysis is obtained. In order to collect data for Rietveld analysis, specifically, the measurement time or X-ray intensity is appropriately adjusted in such a manner that the step width is made ⅓ to ⅕ of the minimum half width of the diffraction peaks, and the intensity at the peak position of strongest reflected intensity is 5,000 cps or more.

The XRD pattern obtained as described above is analyzed by the Rietveld method. In the Rietveld method, the diffraction pattern is calculated from the crystal structure model that has been estimated in advance. Here, estimation of the crystal structure model is performed based on analysis results of EDX and ICP. The parameters of the crystal structure (lattice constant, atomic coordinate, crystal site occupancy ratio, or the like) can be precisely analyzed by fitting all the calculated values with the measured values.

Through Rietveld analysis, the content of titanium-niobium composite oxide can be estimated, in a case where plural active materials are included. A fitting parameter S is used as the scale for estimating the degree of agreement between the measured intensities and the calculated intensities in the Rietveld analysis. The S value must be less than 1.8 in the analysis. When determining the occupancies in each of the sites, the standard deviation σj must also be taken into consideration. The fitting parameter S and standard deviation σj defined herein are estimated using the formula described in "Funmatsu X sen Kaisetsu no Jissai (Reality of Powder X-Ray Analysis)", 1st edition (2002), X-Ray Analysis Investigation Conversazione, The Japan Society for Analytical Chemistry, written and edited by Izumi Nakai and Fujio Izumi (Asakura Publishing Co., Ltd.).

XRD measurement can be performed with the electrode sample directly attached onto a glass holder of a wide-angle X-ray diffraction apparatus. At this time, an XRD spectrum is measured in advance in accordance with the species of metal foil of the electrode current collector, and the position(s) of appearance of the peak(s) derived from the collector is grasped. In addition, the presence/absence of peak(s) of mixed substances such as an electro-conductive agent or a binder is also grasped. If the peak(s) of the current collector overlaps the peak(s) of the active material, it is desirable to perform measurement with the active material-containing layer removed from the current collector. This is in order to separate the overlapping peaks when quantitatively measuring the peak intensities. If the overlapping peaks can be grasped beforehand, the above operations can be omitted, of course.

Provided that the particles observed by the aforementioned SEM-EDX measurement contain Ti, Nb and O, and further that an X-ray diffraction pattern assigned to monoclinic is obtained from an electrode measured by the aforementioned XRD, such results indicate that particles of monoclinic titanium-niobium composite oxide are present in the active material measured. When EDX measurement shows that the active material includes particles having contents of Ti and Nb that differ greatly, there is a possibility that the active material-containing layer contains plural of active materials. An amount of the elements contained in the active material in the electrode can be specified by ICP emission spectrometry according to the above procedure.

An amount of the titanium-niobium composite oxide in the active material-containing layer is estimated by the following method.

After washing and drying the electrode taken out of the battery by the above procedure, the active material-containing layer is dislodged from the current collector and ground in a mortar. The ground sample is put into a glass sample plate and leveled off so that a surface of the sample matches a surface of the glass sample plate. In addition, a Si standard sample may be added to correct peak positions.

XRD measurement and Rietveld analysis are performed on the powder sample filled in the glass sample plate under the aforementioned conditions. Furthermore, SEM-EDX measurement and ICP measurement are performed by the aforementioned procedure using the powder sample; Based on the results of XRD measurement, SEM-EDX measurement and ICP measurement, active material species contained and proportions of the active materials are estimated.

<Method of Measuring Pore Diameter Distribution According to Mercury Porosimetry>

Measurement of the pore diameter distribution for the active material containing-layer according to mercury porosimetry is performed by the following procedure, for example.

First, the electrode sample is divided into the active material containing-layer and the current collector. A sample having a size of about 50 mm×50 mm is cut out from the active material containing-layer separated from the current collector. This sample is folded and taken in a measurement cell, and is subjected to measurement under conditions of an initial pressure of 5 kPa (about 0.7 psia, which corresponds to a pore diameter of about 250 μm) and a terminal pressure of about 60 thousand psia (which corresponds to a pore diameter of about 0.003 μm).

For example, Autopore 9520, manufactured by Shimadzu Corporation can be used as the measurement device of the pore diameter distribution. It is possible to obtain a volume of pores, and a mode diameter and a median diameter of gaps from the pore diameter distribution according to mercury porosimetry.

Incidentally, the principle utilized in analysis by mercury porosimetry is based on the Washburn equation of Formula (1).

$$D=-4\gamma\cos\theta/P \qquad \text{Formula (1)}$$

Herein, P indicates pressure, D indicates pore diameter, γ indicates surface tension (480 dyne·cm$^{-1}$) of mercury, and θ indicates a contact angle between mercury and a pore wall surface, which is, 140°. Since γ and θ are constants, the relation between the applied pressure P and the pore diameter D is obtained from Washburn's equation, and the pore diameter and volume distribution can thus be derived by measuring the volume of intruded mercury at that time.

In this manner, a pore diameter distribution of the whole active material-containing layer (pore diameter distribution of the third thickness region) can be obtained. A peak position of a peak having the highest peak intensity (the maximum peak) in the obtained pore diameter distribution spectrum corresponds to the pore diameter A.

In measuring a pore diameter distribution in the half of the active material-containing layer at the side of the current collector (first thickness region), for example, a measurement sample is prepared in the following manner. First, among the active material-containing layer of the electrode sample, a section (second thickness region) spanning a range of from length 0.5t to length t from the current collector with respect to the thickness t of the active material-containing layer is shaved off. For example, using a surface cutting device such as Surface And Interfacial Cutting Analysis System (SAICAS, registered trademark), the half not facing the current collector is removed. Next, the remaining section of the active material-containing layer up to the length 0.5t (first thickness region) is separated from the current collector. A sample of about 50 mm×50 mm is cut out from the active material-containing layer separated from the current collector. This sample is folded and placed in a measurement cell to perform measurement under the aforementioned conditions. Based on the measured mercury intrusion volume and the Washburn equation, a pore diameter and a volume distribution are derived for the first thickness region to obtain a pore diameter distribution. A value of a peak having the highest peak intensity (the greatest peak) in the obtained pore diameter distribution spectrum corresponds to the pore diameter B.

The electrode according to the first embodiment includes a current collector and an active material-containing layer. The active material-containing layer is disposed on the current collector, and contains titanium-niobium composite oxide. An area ratio S1 occupied by titanium-niobium composite oxide within a first cross-section among a cross-section of the active material-containing layer along a stacking direction of the current collector and the active material-containing layer, which corresponds to a first thickness region ranging from the current collector to length 0.5t of a thickness t of the active material-containing layer along the stacking direction, and an area ratio S2 occupied by the titanium-niobium composite oxide within a second cross-section among the cross-section, which corresponds to a second thickness region ranging along the stacking direction from length 0.5t to length t from the current collector, satisfy a relationship of 0.8<S2/S1<1. A peak-top position of a maximum peak in a particle diameter frequency distribution of particles of titanium-niobium composite oxide in the active material-containing layer is within a range of from 0.5 μm to 3 μm. According to the electrode according to the above embodiment, a battery exhibiting excellent life performance can be obtained.

[Second Embodiment]

According to a second embodiment, there is provided a secondary battery including a negative electrode, a positive electrode, and an electrolyte. As the negative electrode, the secondary battery includes the electrode according to the first embodiment.

The secondary battery according to the second embodiment may further include a separator provided between the positive electrode and the negative electrode. The negative electrode, the positive electrode, and the separator may configure an electrode group. The electrolyte may be held in the electrode group.

The secondary battery according to the second embodiment may further include a container member that houses the electrode group and the electrolyte.

Moreover, the secondary battery according to the second embodiment may further include a negative electrode terminal electrically connected to the negative electrode and a positive electrode terminal electrically connected to the positive electrode.

The secondary battery according to the second embodiment may be, for example, a lithium secondary battery. The secondary battery also includes nonaqueous electrolyte secondary batteries containing nonaqueous electrolyte(s).

Hereinafter, the negative electrode, the positive electrode, the electrolyte, the separator, the container member, the negative electrode terminal, and the positive electrode terminal will be described in detail.

(1) Negative Electrode

The negative electrode may include a negative electrode current collector and a negative electrode active material-containing layer. The negative electrode current collector and the negative electrode active material-containing layer may respectively be the current collector and active material-containing layer that may be included in the electrode according to the first embodiment.

Of the details of the negative electrode, sections overlapping with the details described in the first embodiment are omitted.

The density of the negative electrode active material-containing layer (excluding the current collector) is preferably from 1.8 g/cm$^3$ to 2.8 g/cm$^3$. The negative electrode, in which the density of the negative electrode active material-containing layer is within this range, is excellent in energy density and ability to hold the electrolyte. The density of the negative electrode active material-containing layer is more preferably from 2.1 g/cm$^3$ to 2.6 g/cm$^3$.

The negative electrode may be produced by the same method as that for the electrode according to the first embodiment, for example.

(2) Positive Electrode

The positive electrode may include a positive electrode current collector and a positive electrode active material-containing layer. The positive electrode active material-containing layer may be formed on one surface or both of reverse surfaces of the positive electrode current collector. The positive electrode active material-containing layer may include a positive electrode active material, and optionally an electro-conductive agent and a binder.

As the positive electrode active material, for example, an oxide or a sulfide may be used. The positive electrode may singly include one species of compound as the positive electrode active material, or alternatively, include two or more species of compounds in combination. Examples of the oxide and sulfide include compounds capable of having Li and Li ions be inserted and extracted.

Examples of such compounds include manganese dioxides ($MnO_2$), iron oxides, copper oxides, nickel oxides, lithium manganese composite oxides (e.g., $Li_pMn_2O_4$ or $Li_pMnO_2$; $0<p\leq1$), lithium aluminum manganese composite oxide (e.g., $Li_pAl_qMn_{2-q}O_4$; $0<p\leq1$, $0<q<1$), lithium nickel composite oxides (e.g., $Li_pNiO_2$; $0<p\leq1$), lithium cobalt composite oxides (e.g., $Li_pCoO_2$; $0<p\leq1$), lithium nickel cobalt composite oxides (e.g., $Li_pNi_{1-q}Co_qO_2$; $0<p<1$, $0<q<1$), lithium manganese cobalt composite oxides (e.g., $Li_pMn_qCo_{1-q}O_2$; $0<p\leq1$, $0<q<1$), lithium manganese nickel composite oxides having a spinel structure (e.g., $Li_pMn_{2-h}Ni_hO_4$; $0<p\leq1$, $0<h<2$), lithium phosphates having an olivine structure (e.g., $Li_pFePO_4$; $0<p\leq1$, $Li_pMnPO_4$; $0<p\leq1$, $Li_pMn_{1-q}Fe_qPO_4$; $0<p\leq1$, $0<q<1$, $Li_pCoPO_4$; $0<p\leq1$), iron sulfates ($Fe_2(SO_4)_3$), vanadium oxides (e.g., $V_2O_5$), lithium nickel cobalt manganese composite oxides ($Li_pNi_{1-q-r}Co_qMn_rO_2$; $0<p\leq1$, $0<q<1$, $0<r<1$, $q+r<1$), and lithium nickel cobalt aluminum composite oxide (e.g., $LiNi_{1-q-r}Co_qAl_rO_2$; $0<q<1$, $0<r<1$, $q+r<1$).

Among the above, examples of compounds more preferable as the positive electrode active material include lithium manganese composite oxides having a spinel structure (e.g., $Li_pMn_2O_4$; $0<p\leq1$), lithium aluminum manganese composite oxide having a spinel structure (e.g., $Li_pAl_qMn_{2-q}O_4$; $0<p\leq1$, $0<q<1$), lithium nickel composite oxides (e.g., $Li_pNiO_2$; $0<p\leq1$), lithium cobalt composite oxides (e.g., $Li_pCoO_2$; $0<p\leq1$), lithium nickel cobalt composite oxides (e.g., $Li_pNi_{1-q}Co_qO_2$; $0<p\leq1$, $0<q<1$), lithium manganese nickel composite oxides having a spinel structure (e.g., $Li_pMn_{2-h}Ni_hO_4$; $0<p\leq1$, $0<h<2$), lithium manganese cobalt composite oxides (e.g., $Li_pMn_qCo_{1-q}O_2$; $0<p\leq1$, $0<q<1$), lithium iron phosphates (e.g., $Li_pFePO_4$; $0<p\leq1$), lithium nickel cobalt manganese composite oxides ($Li_pNi_{1-q-r}Co_qMn_rO_2$; $0<p\leq1$, $0<q<1$, $0<r<1$, $q+r<1$), and lithium phosphates having an olivine structure (e.g., $Li_pFePO_4$; $0<p\leq1$, $Li_pMnPO_4$; $0<p\leq1$, $Li_pMn_{1-q}Fe_qPO_4$; $0<p\leq1$, $0<q<1$, and $Li_pCoPO_4$; $0<p\leq1$). The positive electrode potential can be made high by using these positive electrode active materials.

When a room temperature molten salt is used as the electrolyte of the battery, it is preferable to use a positive electrode active material including lithium iron phosphate, $Li_bVPO_4F$ (0≤b≤1), lithium manganese composite oxide, lithium nickel composite oxide, lithium nickel cobalt composite oxide, or a mixture thereof. Since these compounds have low reactivity with room temperature molten salts, cycle life can be improved. Details regarding the room temperature molten salt are described later.

The primary particle diameter of the positive electrode active material is preferably from 100 nm to 1 μm. The positive electrode active material having a primary particle size of 100 nm or more is easy to handle during industrial production. In the positive electrode active material having a primary particle size of 1 μm or less, ion-solid diffusion of lithium ions can proceed smoothly.

The specific surface area of the positive electrode active material is preferably from 0.1 $m^2/g$ to 10 $m^2/g$. The positive electrode active material having a specific surface area of 0.1 $m^2/g$ or more can secure sufficient sites for inserting and extracting Li ions. The positive electrode active material having a specific surface area of 10 $m^2/g$ or less is easy to handle during industrial production, and can secure a good charge and discharge cycle performance.

The binder is added to fill gaps among the dispersed active material and also to bind the active material with the current collector. Examples of the binder include polytetrafluoroethylene (PTFE), polyvinylidene fluoride (PVdF), fluorine rubber, styrene-butadiene rubber (SBR), acrylic polymers, acrylic copolymers, polyacrylate compounds such as polyacrylate and polyacrylonitrile, imide compounds, polyimide, polyamide imide, polyvinyl alcohol, urethane polymers, urethane copolymers, carboxymethyl cellulose (CMC), and salts of CMC. One of these may be used as the binder, or alternatively, two or more may be used in combination as the binder.

The electro-conductive agent is added to improve current collection performance and to suppress the contact resistance between the positive electrode active material and the positive electrode current collector. Examples of electro-conductive agent include carbonaceous substances such as vapor grown carbon fiber (VGCF), carbon black such as acetylene black, graphite, graphene, carbon nanofiber, and carbon nanotube. One of these may be used as the electro-conductive agent, or two or more may be used in combination as the electro-conductive agent. The electro-conductive agent may be omitted.

In the positive electrode active material-containing layer, the positive electrode active material and binder are preferably blended in proportions of 80% by mass to 98% by mass, and 2% by mass to 20% by mass, respectively.

When the amount of the binder is 2% by mass or more, sufficient electrode strength can be achieved. The binder may serve as an electrical insulator. Thus, when the amount of the binder is 20% by mass or less, the amount of insulator in the electrode is reduced, and thereby the internal resistance can be decreased.

When an electro-conductive agent is added, the positive electrode active material, binder, and electro-conductive agent are preferably blended in proportions of 80% by mass to 95% by mass, 2% by mass to 17% by mass, and 3% by mass to 18% by mass, respectively.

When the amount of the electro-conductive agent is 3% by mass or more, the above-described effects can be expressed. By setting the amount of the electro-conductive agent to 18% by mass or less, the proportion of electro-conductive agent that contacts the electrolyte can be made low. When this proportion is low, decomposition of electrolyte can be reduced during storage under high temperatures.

The positive electrode current collector is preferably an aluminum foil, or an aluminum alloy foil containing one or more selected from the group consisting of Mg, Ti, Zn, Ni, Cr, Mn, Fe, Cu, and Si.

The thickness of the aluminum foil or aluminum alloy foil is preferably from 5 μm to 20 μm, and more preferably 15 μm or less. The purity of the aluminum foil is preferably 99% by mass or more. The amount of transition metal such as iron, copper, nickel, or chromium contained in the aluminum foil or aluminum alloy foil is preferably 1% by mass or less.

The positive electrode current collector may include a portion where a positive electrode active material-containing layer is not formed on a surface of thereof. This portion may serve as a positive electrode current collecting tab.

The positive electrode may be produced by the following method, for example. First, positive electrode active material, electro-conductive agent, and binder are suspended in a solvent to prepare a slurry. The slurry is applied onto one surface or both of reverse surfaces of a positive electrode current collector. Next, the applied slurry is dried to form a stack of active material-containing layer(s) and current collector. Then, the stack is subjected to pressing. The positive electrode can be produced in this manner.

Alternatively, the positive electrode may also be produced by the following method. First, positive active material, electro-conductive agent, and binder are mixed to obtain a mixture. Next, the mixture is formed into pellets. Then the positive electrode can be obtained by arranging the pellets on the positive electrode current collector.

(3) Electrolyte

As the electrolyte, for example, a liquid nonaqueous electrolyte or gel nonaqueous electrolyte may be used. The liquid nonaqueous electrolyte is prepared by dissolving an electrolyte salt as solute in an organic solvent. The concentration of electrolyte salt is preferably from 0.5 mol/L to 2.5 mol/L.

Examples of the electrolyte salt include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_G$), lithium trifluoromethanesulfonate ($LiCF_3SO_3$), and lithium bistrifluoromethylsulfonylimide [$LiN(CF_3SO_2)_2$], and mixtures thereof. The electrolyte salt is preferably resistant to oxidation even at a high potential, and most preferably $LiPF_G$.

Examples of the organic solvent include cyclic carbonates such as propylene carbonate (PC), ethylene carbonate (EC), and vinylene carbonate (VC); linear carbonates such as diethyl carbonate (DEC), dimethyl carbonate (DMC), and methyl ethyl carbonate (MEC); cyclic ethers such as tetrahydrofuran (THF), 2-methyl tetrahydrofuran (2-MeTHF), and dioxolane (DOX); linear ethers such as dimethoxy ethane (DME) and diethoxy ethane (DEE); γ-butyrolactone (GBL), acetonitrile (AN), and sulfolane (SL). These organic solvents may be used singularly or as a mixed solvent.

Examples of more preferable organic solvents include mixed solvents where mixed are two or more selected from the group consisting of propylene carbonate (PC), ethylene carbonate (EC), diethyl carbonate (DEC), dimethyl carbonate (DMC), and methyl ethyl carbonate (MEC). By using such a mixed solvent, there can be obtained a nonaqueous electrolyte secondary battery that is excellent in charge and discharge performance. In addition, an additive other than the above described electrolyte salts may be added to the liquid electrolyte.

The gel nonaqueous electrolyte is prepared by obtaining a composite of a liquid nonaqueous electrolyte and a polymeric material. Examples of the polymeric material include polyvinylidene fluoride (PVdF), polyacrylonitrile (PAN), polyethylene oxide (PEO), and mixtures thereof.

Alternatively, other than the liquid nonaqueous electrolyte and gel nonaqueous electrolyte, a room temperature molten salt (ionic melt) including lithium ions, a polymer solid electrolyte, an inorganic solid electrolyte, or the like may be used as the nonaqueous electrolyte.

The room temperature molten salt (ionic melt) indicates compounds among organic salts made of combinations of organic cations and anions, which are able to exist in a liquid state at room temperature (15° C. to 25° C.). The room temperature molten salt includes a room temperature molten salt which exists alone as a liquid, a room temperature molten salt which becomes a liquid upon mixing with an electrolyte salt, a room temperature molten salt which becomes a liquid when dissolved in an organic solvent, and mixtures thereof. In general, the melting point of the room temperature molten salt used in secondary batteries is 25° C. or below. The organic cations generally have a quaternary ammonium framework.

The polymer solid electrolyte is prepared by dissolving the electrolyte salt in a polymeric material, and solidifying it.

The inorganic solid electrolyte is a solid substance having Li ion conductivity.

(4) Separator

The separator may be made of, for example, a porous film or synthetic resin nonwoven fabric including polyethylene (PE), polypropylene (PP), polyethylene terephthalate (PET), cellulose, or polyvinylidene fluoride (PVdF). Other than that, there may be used separators where inorganic compounds or organic compounds are applied onto a porous film. In view of safety, a porous film made of polyethylene or polypropylene is preferred. This is because such a porous film melts at a fixed temperature and thus able to shut off current.

(5) Container Member

As the container member, for example, a container made of laminate film or a container made of metal may be used.

The thickness of the laminate film is, for example, 0.5 mm or less, and preferably 0.2 mm or less.

As the laminate film, used is a multilayer film including multiple resin layers and a metal layer sandwiched between the resin layers. The resin layer may include, for example, a polymeric material such as polypropylene (PP), polyethylene (PE), nylon, or polyethylene terephthalate (PET). The metal layer is preferably made of aluminum foil or an aluminum alloy foil, so as to reduce weight. The laminate film may be formed into the shape of a container member, by heat-sealing.

The wall thickness of the metal container is, for example, 1 mm or less, more preferably 0.5 mm or less, and still more preferably 0.2 mm or less.

The metal container is made, for example, of aluminum or an aluminum alloy. The aluminum alloy preferably contains elements such as magnesium, zinc, or silicon. If the aluminum alloy contains a transition metal such as iron, copper, nickel, or chromium, the content thereof is preferably 100 ppm by mass or less. In a battery including such a metal container, drastic improvements in long-term reliability and heat releasing properties become possible.

The shape of the container member is not particularly limited. The shape of the container member may be, for example, flat (thin), square, cylindrical, coin-shaped, button-shaped, sheet-shaped, and stack-shaped. The container member may be appropriately selected depending on battery size and use of the battery. For example, the container member may be a container member for small-sized batteries to be installed on mobile electronic devices and the like. The container member may be a container member for large-scale batteries to be installed on vehicles, such as two- to four-wheeled automobiles.

(6) Negative Electrode Terminal

The negative electrode terminal may be made of a material that is electrically stable within a potential range of 0.8 V to 3 V (V vs. Li/Li$^+$) relative to a redox potential of lithium, and having electrical conductivity. Specific examples of the material for the negative electrode terminal include copper, nickel, stainless steel, aluminum, and aluminum alloy containing at least one selected from the group consisting of Mg, Ti, Zn, Mn, Fe, Cu, and Si. Aluminum or aluminum alloy is preferred as the material for the negative electrode terminal. The negative electrode terminal is preferably made of the same material as the negative electrode current collector, in order to reduce contact resistance between the negative electrode terminal and the negative electrode current collector.

(7) Positive Electrode Terminal

The positive electrode terminal may be made of, for example, a material that is electrically stable in the potential range of 3 V to 4.5 V (vs. Li/Li$^+$) relative to the redox potential of lithium, and having electrical conductivity. Examples of the material for the positive electrode terminal include aluminum and an aluminum alloy containing one or more selected from the group consisting of Mg, Ti, Zn, Mn, Fe, Cu, and Si. The positive electrode terminal is preferably made of the same material as the positive electrode current collector, in order to reduce contact resistance between the positive electrode terminal and the positive electrode current collector.

Next, the secondary battery according to the second embodiment will be more concretely described with reference to the drawings.

Figure 5:
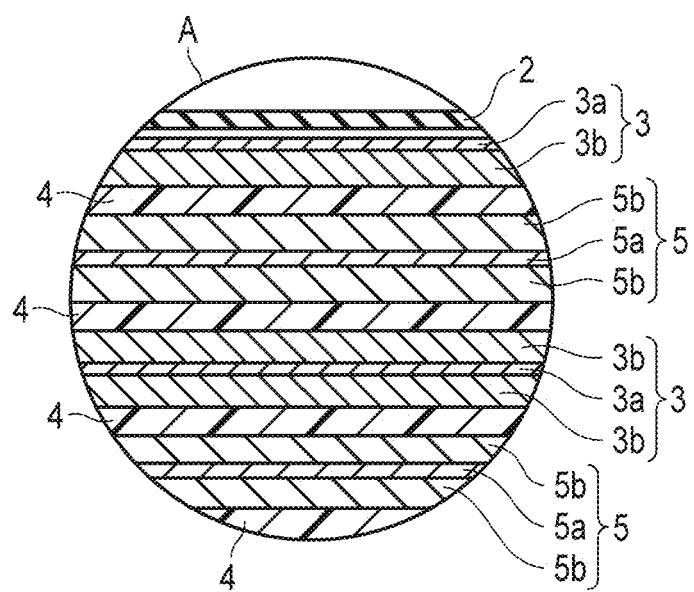
FIG. 5 is an enlarged cross-sectional view of section A of the secondary battery shown in FIG. 4.

FIG. 4 is a cross-sectional view schematically showing an example of a secondary battery according to the second embodiment. FIG. 5 is an enlarged cross-sectional view of section A of the secondary battery shown in FIG. 4.

The secondary battery 100 shown in FIGS. 4 and 5 includes a bag-shaped container member 2 shown in FIG. 4, an electrode group 1 shown in FIGS. 4 and 5, and an electrolyte, which is not shown. The electrode group 1 and the electrolyte are housed in the bag-shaped container member 2. The electrolyte (not shown) is held in the electrode group 1.

The bag-shaped container member 2 is made of a laminate film including two resin layers and a metal layer sandwiched between the resin layers.

As shown in FIG. 4, the electrode group 1 is a wound electrode group in a flat form. The wound electrode group 1 in a flat form includes a negative electrode 3, a separator 4, and a positive electrode 5, as shown in FIG. 5. The separator 4 is sandwiched between the negative electrode 3 and the positive electrode 5.

The negative electrode 3 includes a negative electrode current collector 3$a$ and a negative electrode active material-containing layer 3$b$. At the portion of the negative electrode 3 positioned outermost among the wound electrode group 1, the negative electrode active material-containing layer 3$b$ is formed only on an inner surface of the negative electrode current collector 3$a$, as shown in FIG. 5. For the other portions of the negative electrode 3, negative electrode active material-containing layers 3b are formed on both of reverse surfaces of the negative electrode current collector 3a.

The positive electrode 5 includes a positive electrode current collector 5a and positive electrode active material-containing layers 5b formed on both of reverse surfaces of the positive electrode current collector 5a.

As shown in FIG. 4, a negative electrode terminal 6 and positive electrode terminal 7 are positioned in vicinity of the outer peripheral edge of the wound electrode group 1. The negative electrode terminal 6 is connected to a portion of the negative electrode current collector 3a positioned outermost. The positive electrode terminal 7 is connected to a portion of the positive electrode current collector 5a positioned outermost. The negative electrode terminal 6 and the positive electrode terminal 7 extend out from an opening of the bag-shaped container member 2. A thermoplastic resin layer is provided on the inner surface of the bag-shaped container member 2, and the opening is sealed by heat-sealing the resin layer.

Figure 6:
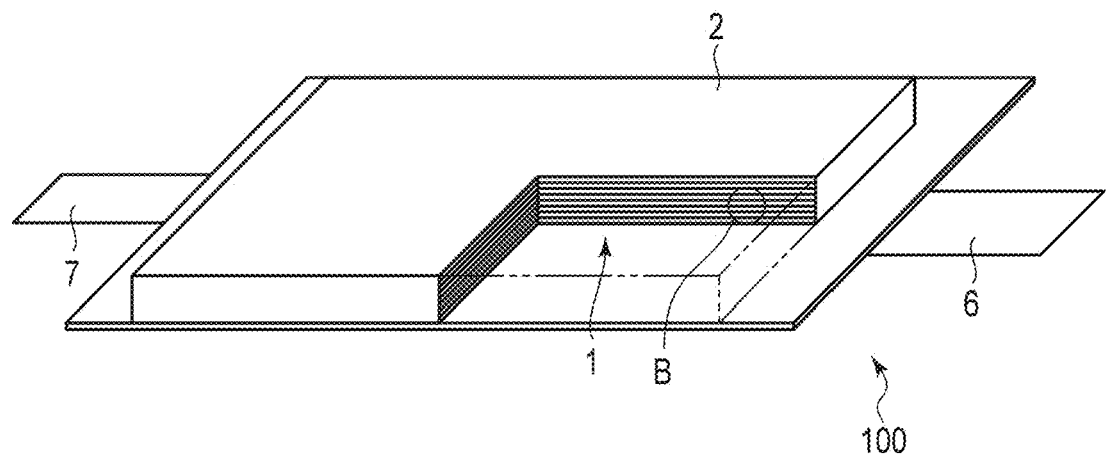
FIG. 6 is a partially cut-out perspective view schematically showing another example of the secondary battery according to an embodiment.
Figure 7:
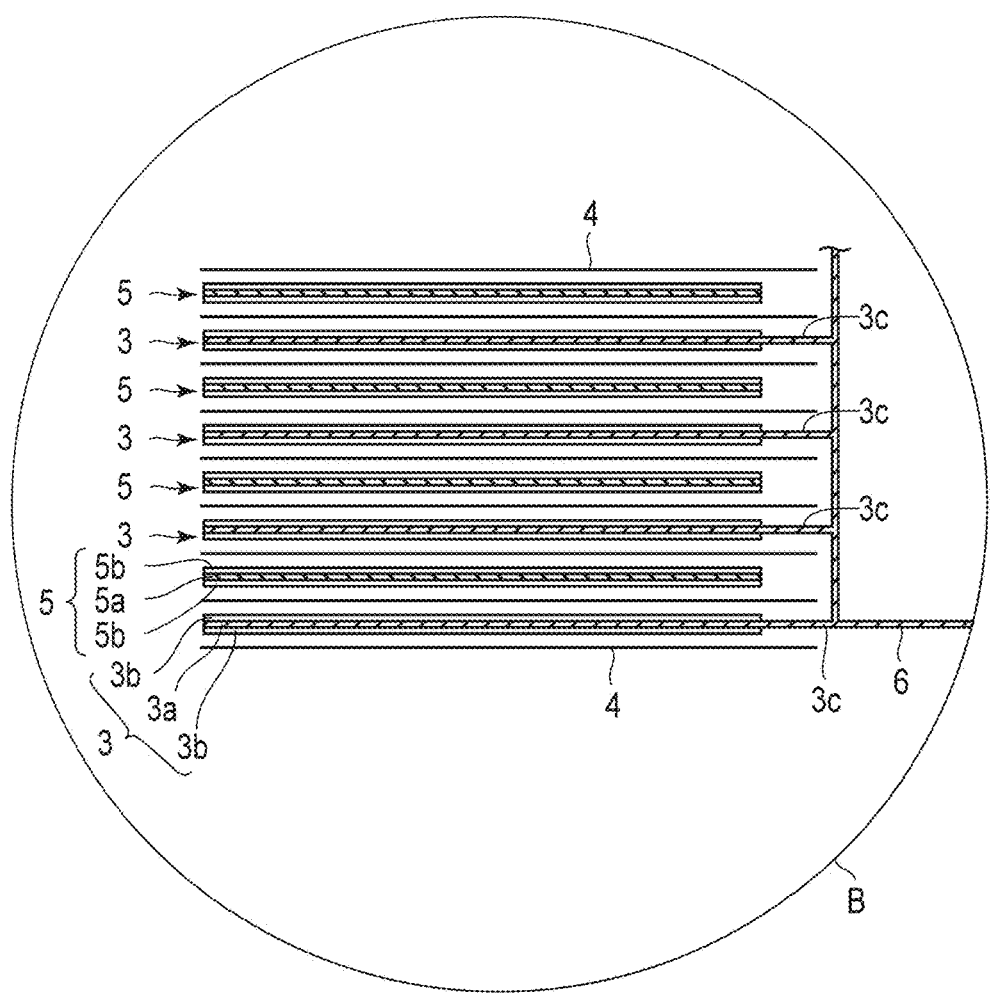
FIG. 7 is an enlarged cross-sectional view of section B of the secondary battery shown in FIG. 6.

The secondary battery according to the second embodiment is not limited to the secondary battery of the structure shown in FIGS. 4 and 5, and may be, for example, a battery of a structure as shown in FIGS. 6 and 7.

FIG. 6 is a partially cut-out perspective view schematically showing another example of the secondary battery according to the second embodiment. FIG. 7 is an enlarged cross-sectional view of section B of the secondary battery shown in FIG. 6.

The secondary battery 100 shown in FIGS. 6 and 7 includes an electrode group 1 shown in FIGS. 6 and 7, a container member 2 shown in FIG. 6, and an electrolyte, which is not shown. The electrode group 1 and electrolyte are housed in the container member 2. The electrolyte is held in the electrode group 1.

The container member 2 is made of a laminate film including two resin layers and a metal layer sandwiched between the resin layers.

As shown in FIG. 7, the electrode group 1 is a stacked electrode group. The stacked electrode group 1 has a structure in which negative electrodes 3 and positive electrodes 5 are alternately stacked with separator(s) 4 sandwiched therebetween.

The electrode group 1 includes plural negative electrodes 3. Each of the negative electrodes 3 includes the negative electrode current collector 3a and the negative electrode active material-containing layers 3b supported on both surfaces of the negative electrode current collector 3a. The electrode group 1 further includes plural positive electrodes 5. Each of the positive electrodes 5 includes the positive electrode current collector 5a and the positive electrode active material-containing layers 5b supported on both surfaces of the positive electrode current collector 5a.

The negative electrode current collector 3a of each of the negative electrodes 3 includes at one end, a portion 3c where the negative electrode active material-containing layer 3b is not supported on either surface. This portion 3c serves as a negative electrode tab. As shown in FIG. 7, the portions 3c serving as the negative electrode tabs do not overlap the positive electrodes 5. The plural negative electrode tabs (portions 3c) are electrically connected to the strip-shaped negative electrode terminal 6. A tip of the strip-shaped negative electrode terminal 6 is drawn to the outside from the container member 2.

Although not shown, the positive electrode current collector 5a of each of the positive electrodes 5 includes at one end, a portion where the positive electrode active material-containing layer 5b is not supported on either surface. This portion serves as a positive electrode tab. Like the negative electrode tabs (portion 3c), the positive electrode tabs do not overlap the negative electrodes 3. Further, the positive electrode tabs are located on the opposite side of the electrode group 1 with respect to the negative electrode tabs (portion 3c). The positive electrode tabs are electrically connected to the strip-shaped positive electrode terminal 7. A tip of the strip-shaped positive electrode terminal 7 is located on the opposite side relative to the negative electrode terminal 6 and drawn to the outside from the container member 2.

The secondary battery according to the second embodiment includes the electrode according to the first embodiment. Thus, the secondary battery according to the second embodiment is excellent in life performance.

[Third Embodiment]

According to a third embodiment, a battery module is provided. The battery module according to the third embodiment includes plural of secondary batteries according to the second embodiment.

In the battery module according to the third embodiment, each of the single-batteries may be arranged to be electrically connected in series or in parallel, or may be arranged in combination of in-series connection and in-parallel connection.

An example of the battery module according to the third embodiment will be described next, with reference to the drawings.

Figure 8:
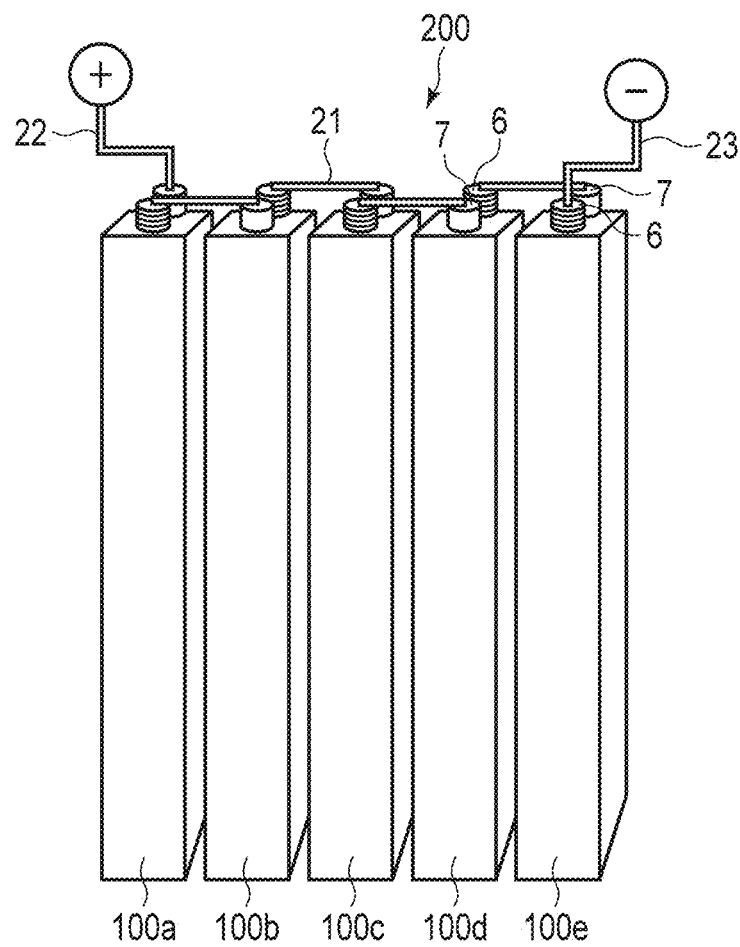
FIG. 8 is a perspective view schematically showing an example of a battery module according to an embodiment.

FIG. 8 is a perspective view schematically showing an example of the battery module according to the third embodiment. The battery module 200 shown in FIG. 8 includes five single-batteries 100a to 100e, four bus bars 21, a positive electrode-side lead 22, and a negative electrode-side lead 23. Each of the five single-batteries 100a to 100e is the secondary battery according to the second embodiment.

The bus bar 21 connects, for example, a negative electrode terminal 6 of one single-battery 100a and a positive electrode terminal 7 of the single-battery 100b positioned adjacent. In such a manner, five single-batteries 100 are thus connected in series by the four bus bars 21. That is, the battery module 200 shown in FIG. 8 is a battery module of five-in-series connection. Although no example is depicted in drawing, in a battery module including plural single-batteries that are electrically connected in parallel, for example, the plural single-batteries may be electrically connected by having plural negative electrode terminals being connected to each other by bus bars while having plural positive electrode terminals being connected to each other by bus bars.

The positive electrode terminal 7 of at least one battery among the five single-batteries 100a to 100e is electrically connected to the positive electrode-side lead 22 for external connection. In addition, the negative electrode terminal 6 of at least one battery among the five single-batteries 100a to 100e is electrically connected to the negative electrode-side lead 23 for external connection.

The battery module according to the third embodiment includes the secondary battery according to the second embodiment. Therefore, the battery module is excellent in life performance.

[Fourth Embodiment]

According to a fourth embodiment, a battery pack is provided. The battery pack includes a battery module according to the third embodiment. The battery pack may include a single secondary battery according to the second embodiment, in place of the battery module according to the third embodiment.

The battery pack according to the fourth embodiment may further include a protective circuit. The protective circuit has a function to control charging and discharging of the secondary battery. Alternatively, a circuit included in equipment where the battery pack serves as a power source (for example, electronic devices, automobiles, and the like) may be used as the protective circuit for the battery pack.

Moreover, the battery pack according to the fourth embodiment may further include an external power distribution terminal. The external power distribution terminal is configured to externally output current from the secondary battery, and/or to input external current into the secondary battery. In other words, when the battery pack is used as a power source, the current is provided out via the external power distribution terminal. When the battery pack is charged, the charging current (including regenerative energy of motive force of vehicles such as automobiles) is provided to the battery pack via the external power distribution terminal.

Next, an example of a battery pack according to the fourth embodiment will be described with reference to the drawings.

Figure 9:
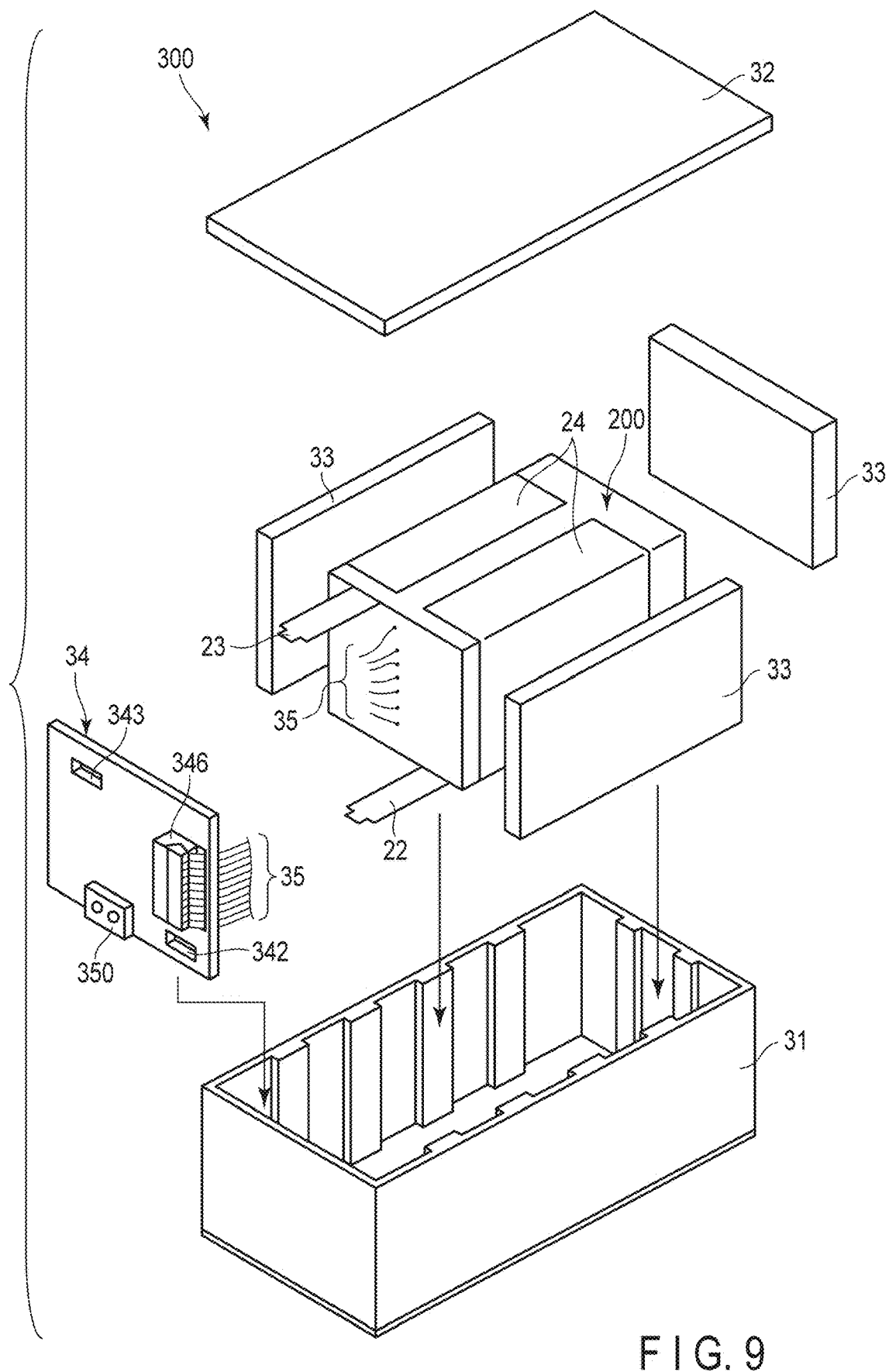
FIG. 9 is an exploded perspective view schematically showing an example of a battery pack according to an embodiment.
Figure 10:
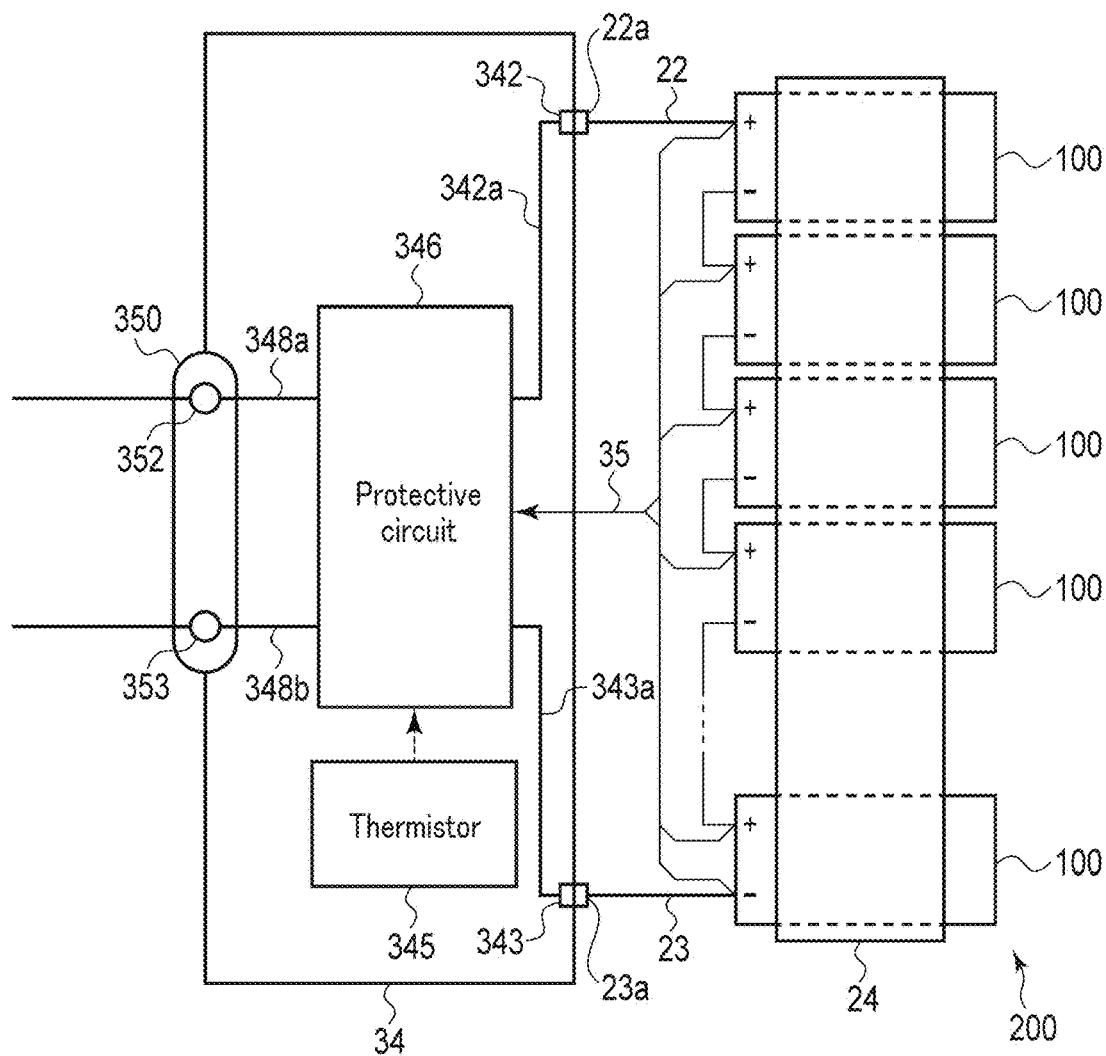
FIG. 10 is a block diagram showing an example of an electric circuit of the battery pack shown in FIG. 9.

FIG. 9 is an exploded perspective view schematically showing an example of the battery pack according to the fourth embodiment. FIG. 10 is a block diagram showing an example of an electric circuit of the battery pack shown in FIG. 9.

A battery pack 300 shown in FIGS. 9 and 10 includes a housing container 31, a lid 32, protective sheets 33, a battery module 200, a printed wiring board 34, wires 35, and an insulating plate (not shown).

The housing container 31 shown in FIG. 9 is a square bottomed container having a rectangular bottom surface. The housing container 31 is configured to be capable of housing the protective sheets 33, the battery module 200, the printed wiring board 34, and the wires 35. The lid 32 has a rectangular shape. The lid 32 covers the housing container 31 to house the battery module 200 and such. Although not illustrated, the housing container 31 and the lid 32 are provided with openings, connection terminals, or the like for connection to an external device or the like.

The battery module 200 includes plural single-batteries 100, a positive electrode-side lead 22, a negative electrode-side lead 23, and adhesive tape(s) 24.

At least one of the plural single-batteries 100 is a secondary battery according to the second embodiment. The plural single-batteries 100 are electrically connected in series, as shown in FIG. 10. The plural single-batteries 100 may alternatively be electrically connected in parallel, or connected in a combination of in-series connection and in-parallel connection. If the plural single-batteries 100 are connected in parallel, the battery capacity increases as compared to a case in which they are connected in series.

The adhesive tape(s) 24 fastens the plural single-batteries 100. The plural single-batteries 100 may be fixed using a heat shrinkable tape in place of the adhesive tape(s) 24. In this case, protective sheets 33 are arranged on both side surfaces of the battery module 200, and the heat shrinkable tape is wound around the battery module 200 and protective sheets 33. After that, the heat shrinkable tape is shrunk by heating to bundle the plural single-batteries 100.

One end of the positive electrode-side lead 22 is connected to the battery module 200. The one end of the positive electrode-side lead 22 is electrically connected to the positive electrode(s) of one or more single-battery 100. One end of the negative electrode-side lead 23 is connected to the battery module 200. The one end of the negative electrode-side lead 23 is electrically connected to the negative electrode (s) of one or more single-battery 100.

The printed wiring board 34 is provided along one face in the short side direction among the inner surfaces of the housing container 31. The printed wiring board 34 includes a positive electrode-side connector 342, a negative electrode-side connector 343, a thermistor 345, a protective circuit 346, wirings 342a and 343a, an external power distribution terminal 350, a plus-side wiring (positive-side wiring) 348a, and a minus-side wiring (negative-side wiring) 348b. One principal surface of the printed wiring board 34 faces a surface of the battery module 200. An insulating plate (not shown) is disposed in between the printed wiring board 34 and the battery module 200.

The other end 22a of the positive electrode-side lead 22 is electrically connected to the positive electrode-side connector 342. The other end 23a of the negative electrode-side lead 23 is electrically connected to the negative electrode side connector 343.

The thermistor 345 is fixed to one principal surface of the printed wiring board 34. The thermistor 345 detects the temperature of each single-battery 100 and transmits detection signals to the protective circuit 346.

The external power distribution terminal 350 is fixed to the other principal surface of the printed wiring board 34. The external power distribution terminal 350 is electrically connected to device(s) that exists outside the battery pack 300. The external power distribution terminal 350 includes a positive-side terminal 352 and a negative-side terminal 353.

The protective circuit 346 is fixed to the other principal surface of the printed wiring board 34. The protective circuit 346 is connected to the positive-side terminal 352 via the plus-side wiring 348a. The protective circuit 346 is connected to the negative-side terminal 353 via the minus-side wiring 348b. In addition, the protective circuit 346 is electrically connected to the positive electrode-side connector 342 via the wiring 342a. The protective circuit 346 is electrically connected to the negative electrode-side connector 343 via the wiring 343a. Furthermore, the protective circuit 346 is electrically connected to each of the plural single-batteries 100 via the wires 35.

The protective sheets 33 are arranged on both inner surfaces of the housing container 31 along the long side direction and on the inner surface along the short side direction facing the printed wiring board 34 across the battery module 200. The protective sheets 33 are made of, for example, resin or rubber.

The protective circuit 346 controls charge and discharge of the plural single-batteries 100. The protective circuit 346 is also configured to cut-off electric connection between the protective circuit 346 and the external power distribution terminal 350 (positive-side terminal 352, negative-side terminal 353) to external device(s), based on detection signals transmitted from the thermistor 345 or detection signals transmitted from each single-battery 100 or the battery module 200.

An example of the detection signal transmitted from the thermistor 345 is a signal indicating that the temperature of the single-battery(s) 100 is detected to be a predetermined temperature or more. An example of the detection signal transmitted from each single-battery 100 or the battery module 200 include a signal indicating detection of overcharge, over-discharge, and overcurrent of the single-battery (s) 100. When detecting over charge or the like for each of the single batteries 100, the battery voltage may be detected, or a positive electrode potential or negative electrode potential may be detected. In the latter case, a lithium electrode to be used as a reference electrode may be inserted into each single battery 100.

Note, that as the protective circuit 346, a circuit included in a device (for example, an electronic device or an automobile) that uses the battery pack 300 as a power source may be used.

As described above, the battery pack 300 includes the external power distribution terminal 350. Hence, the battery pack 300 can output current from the battery module 200 to an external device and input current from an external device to the battery module 200 via the external power distribution terminal 350. In other words, when using the battery pack 300 as a power source, the current from the battery module 200 is supplied to an external device via the external power distribution terminal 350. When charging the battery pack 300, a charge current from an external device is supplied to the battery pack 300 via the external power distribution terminal 350. If the battery pack 300 is used as an onboard battery, the regenerative energy of the motive force of a vehicle can be used as the charge current from the external device.

Note that the battery pack 300 may include plural battery modules 200. In this case, the plural battery modules 200 may be connected in series, in parallel, or connected in a combination of in-series connection and in-parallel connection. The printed wiring board 34 and the wires 35 may be omitted. In this case, the positive electrode-side lead 22 and the negative electrode-side lead 23 may respectively be used as the positive-side terminal and negative-side terminal of the external power distribution terminal.

Such a battery pack 300 is used, for example, in applications where excellent cycle performance is demanded when a large current is extracted. More specifically, the battery pack 300 is used as, for example, a power source for electronic devices, a stationary battery, or an onboard battery for various kinds of vehicles. An example of the electronic device is a digital camera. The battery pack 300 is particularly favorably used as an onboard battery.

The battery pack according to the fourth embodiment is provided with the secondary battery according to the second embodiment or the battery module according to the third embodiment. Accordingly, the battery pack is excellent in life performance.

[Fifth Embodiment]

According to a fifth embodiment, a vehicle is provided. The battery pack according to the fourth embodiment is installed on this vehicle.

In the vehicle according to the fifth embodiment, the battery pack is configured, for example, to recover regenerative energy from motive force of the vehicle. The vehicle may include a mechanism (e.g., a regenerator) configured to convert kinetic energy of the vehicle into regenerative energy.

Examples of the vehicle according to the fifth embodiment include two-wheeled to four-wheeled hybrid electric automobiles, two-wheeled to four-wheeled electric automobiles, electrically assisted bicycles, and railway cars.

In the vehicle according to the fifth embodiment, the installing position of the battery pack is not particularly limited. For example, when installing the battery pack on an automobile, the battery pack may be installed in the engine compartment of the automobile, in rear parts of the vehicle body, or under seats.

The vehicle according to the fifth embodiment may have plural battery packs installed. In such a case, batteries included in each of the battery packs may be electrically connected to each other in series, electrically connected in parallel, or electrically connected in a combination of in-series connection and in-parallel connection. For example, in a case where each battery pack includes a battery module, the battery modules may be electrically connected to each other in series, electrically connected in parallel, or electrically connected in a combination of in-series connection and in-parallel connection. Alternatively, in a case where each battery pack includes a single battery, each of the batteries may be electrically connected to each other in series, electrically connected in parallel, or electrically connected in a combination of in-series connection and in-parallel connection.

An example of the vehicle according to the fifth embodiment is explained below, with reference to the drawings.

Figure 11:
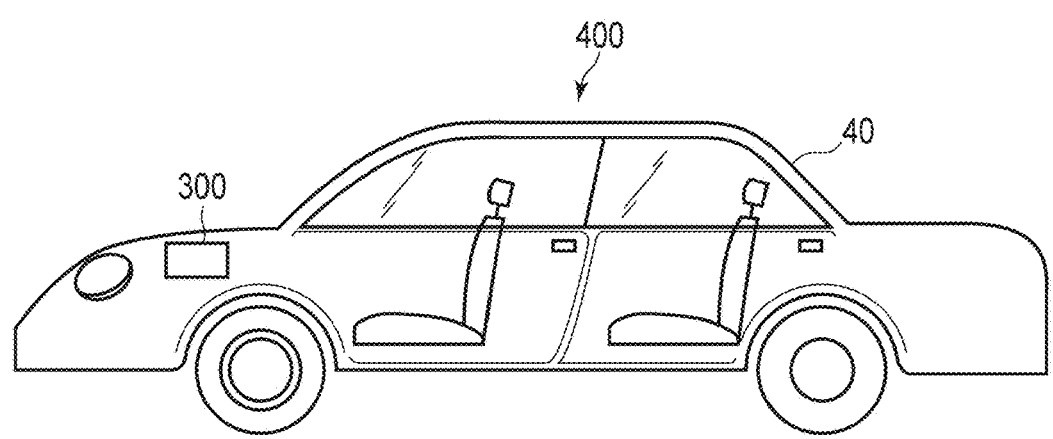
FIG. 11 is a partially see-through diagram schematically showing an example of a vehicle according to an embodiment.

FIG. 11 is a partially see-through diagram schematically showing an example of a vehicle according to the fifth embodiment.

A vehicle 400, shown in FIG. 11 includes a vehicle body 40 and a battery pack 300 according to the third embodiment. In the example shown in FIG. 11, the vehicle 400 is a four-wheeled automobile.

This vehicle 400 may have plural battery packs 300 installed. In such a case, the batteries (e.g., single-batteries or battery module) included in the battery packs 300 may be connected in series, connected in parallel, or connected in a combination of in-series connection and in-parallel connection.

In FIG. 11, depicted is an example where the battery pack 300 is installed in an engine compartment located at the front of the vehicle body 40. As mentioned above, for example, the battery pack 300 may be alternatively installed in rear sections of the vehicle body 40, or under a seat. The battery pack 300 may be used as a power source of the vehicle 400. The battery pack 300 can also recover regenerative energy of motive force of the vehicle 400.

Next, with reference to FIG. 12, an aspect of operation of the vehicle according to the fifth embodiment is explained.

FIG. 12 is a diagram schematically showing an example of a control system related to an electric system in the vehicle according to the fifth embodiment. A vehicle 400, shown in FIG. 11, is an electric automobile.

The vehicle 400, shown in FIG. 12, includes a vehicle body 40, a vehicle power source 41, a vehicle ECU (electric control unit) 42, which is a master controller of the vehicle power source 41, an external terminal (an external power connection terminal) 43, an inverter 44, and a drive motor 45.

The vehicle 400 includes the vehicle power source 41, for example, in the engine compartment, in the rear sections of the automobile body, or under a seat. In FIG. 12, the position of the vehicle power source 41 installed in the vehicle 400 is schematically shown.

The vehicle power source 41 includes plural (for example, three) battery packs 300a, 300b and 300c, a battery management unit (BMU) 411, and a communication bus 412.

The battery pack 300a includes a battery module 200a and a battery module monitoring unit 301a (e.g., a VTM: voltage temperature monitoring). The battery pack 300b includes a battery module 200b and a battery module monitoring unit 301b. The battery pack 300c includes a battery module 200c and a battery module monitoring unit 301c. The battery packs 300a to 300c are battery packs similar to the aforementioned battery pack 300, and the battery modules 200a to 200c are battery modules similar to the aforementioned battery module 200. The battery modules 200a to 200c are electrically connected in series. The battery packs 300a, 300b and 300c can each be independently removed, and may be exchanged by a different battery pack 300.

Each of the battery modules 200a to 200c includes plural single-batteries connected in series. At least one of the plural single-batteries is the secondary battery according to the second embodiment. The battery modules 200a to 200c each perform charging and discharging via a positive electrode terminal 413 and a negative electrode terminal 414.

The battery management unit 411 performs communication with the battery module monitoring units 301a to 301c and collects information such as voltages or temperatures for each of the single-batteries 100 included in the battery modules 200a to 200c included in the vehicle power source 41. In this manner, the battery management unit 411 collects information concerning security of the vehicle power source 41.

The battery management unit 411 and the battery module monitoring units 301a to 301c are connected via the communication bus 412. In communication bus 412, a set of communication lines is shared at multiple nodes (i.e., the battery management unit 411 and one or more battery module monitoring units 301a to 301c). The communication bus 412 is, for example, a communication bus configured based on CAN (Control Area Network) standard.

The battery module monitoring units 301a to 301c measure a voltage and a temperature of each single-battery in the battery modules 200a to 200c based on commands from the battery management unit 411. It is possible, however, to measure the temperatures only at several points per battery module, and the temperatures of all of the single-batteries need not be measured.

The vehicle power source 41 may also have an electromagnetic contactor (for example, a switch unit 415 shown in FIG. 12) for switching on and off electrical connection between the positive electrode terminal 413 and the negative electrode terminal 414. The switch unit 415 includes a precharge switch (not shown), which is turned on when the battery modules 200a to 200c are charged, and a main switch (not shown), which is turned on when output from the battery modules 200a to 200c is supplied to a load. The precharge switch and the main switch each include a relay circuit (not shown), which is switched on or off based on a signal provided to a coil disposed near the switch elements. The magnetic contactor such as the switch unit 415 is controlled based on control signals from the battery management unit 411 or the vehicle ECU 42, which controls the operation of the entire vehicle 400.

The inverter 44 converts an inputted direct current voltage to a three-phase alternate current (AC) high voltage for driving a motor. Three-phase output terminal(s) of the inverter 44 is (are) connected to each three-phase input terminal of the drive motor 45. The inverter 44 is controlled based on control signals from the battery management unit 411 or the vehicle ECU 42, which controls the entire operation of the vehicle. Due to the inverter 44 being controlled, output voltage from the inverter 44 is adjusted.

The drive motor 45 is rotated by electric power supplied from the inverter 44. The drive generated by rotation of the motor 45 is transferred to an axle and driving wheels W via a differential gear unit, for example.

The vehicle 400 also includes a regenerative brake mechanism, though not shown. The regenerative brake mechanism (e.g., a regenerator) rotates the drive motor 45 when the vehicle 400 is braked, and converts kinetic energy into regenerative energy, as electric energy. The regenerative energy, recovered in the regenerative brake mechanism, is inputted into the inverter 44 and converted to direct current. The converted direct current is inputted into the vehicle power source 41.

One terminal of a connecting line L1 is connected to the negative electrode terminal 414 of the vehicle power source 41. The other terminal of the connecting line L1 is connected to a negative electrode input terminal 417 of the inverter 44. A current detector (current detecting circuit) 416 in the battery management unit 411 is provided on the connecting line L1 in between the negative electrode terminal 414 and negative electrode input terminal 417.

One terminal of a connecting line L2 is connected to the positive electrode terminal 413 of the vehicle power source 41. The other terminal of the connecting line L2 is connected to a positive electrode input terminal 418 of the inverter 44. The switch unit 415 is provided on the connecting line L2 in between the positive electrode terminal 413 and the positive electrode input terminal 418.

The external terminal 43 is connected to the battery management unit 411. The external terminal 43 is able to connect, for example, to an external power source.

The vehicle ECU 42 performs cooperative control of the vehicle power source 41, switch unit 415, inverter 44, and the like, together with other management units and control units including the battery management unit 411 in response to inputs operated by a driver or the like. Through the cooperative control by the vehicle ECU 42 and the like, output of electric power from the vehicle power source 41, charging of the vehicle power source 41, and the like are controlled, thereby performing the management of the whole vehicle 400. Data concerning the security of the vehicle power source 41, such as a remaining capacity of the vehicle power source 41, are transferred between the battery management unit 411 and the vehicle ECU 42 via communication lines.

The vehicle according to the fifth embodiment is installed with the battery pack according to the fourth embodiment. Thus, by being provided with the battery pack with excellent life performance, reliability of the vehicle is high.

EXAMPLES

Examples will be described hereinafter, but the embodiments of the present invention are not limited to the examples listed below, so long as the embodiments do not depart from the spirit of the invention.

Example 1

[Production of Electrode]

In the following manner, an electrode was produced by a "twice application, single press" method where, a first slurry and a second slurry were sequentially applied, and then, the whole was rolled once.

(Preparation of Slurry)

Described is preparation of a first slurry. Monoclinic titanium niobium oxide $TiNb_2O_7$ was prepared as an active material. Measurement of particle size distribution by laser diffraction showed that the prepared $TiNb_2O_7$ had an average particle diameter $D_{50}$ of 2.2 μm. Acetylene black (AB) and polyvinylidene fluoride (PVdF) were prepared as an electro-conductive agent and a binder, respectively. $TiNb_2O_7$, AB and PVdF were added at a mixing ratio of 90 parts by mass: 5 parts by mass: 5 parts by mass into N-methylpyrrolidone (NMP) as solvent, and mixed. Next, the resulting mixture was dispersed with a planetary centrifugal mixer to yield the first slurry.

A second slurry was prepared in a similar manner to the first slurry except that a mixing ratio of $TiNb_2O_7$, AB and PVdF was set to 80 parts by mass: 15 parts by mass: 5 parts by mass.

(Application and Drying of Slurry)

The first slurry was applied onto one face of a current collector made of aluminum foil having a thickness of 15 μm. An amount of application was 50 g/m² per area of the current collector. Then, the applied coat was dried. Next, the second slurry was applied onto the coat obtained by applying and drying the first slurry. The second slurry was applied in an amount such that the total application amount of applied coat combining the first slurry and the second slurry applied onto the current collector was 100 g/m². The applied coat of the second slurry was dried so as to yield a stack of the current collector and a layer containing the active material.

(Roll Pressing)

Next, the obtained stack was pressed with a fixed-pressure roll press apparatus to produce an electrode provided with an active material-containing layer having a density of 2.5 g/cm³.

Example 2

An electrode was produced in a similar manner as in Example 1 except that a mixing ratio of $TiNb_2O_7$, AB and PVdF in a second slurry was changed to 83 parts by mass: 17 parts by mass: 5 parts by mass.

Example 3

An electrode was produced in a similar manner as in Example 1, except that a mixing ratio of $TiNb_2O_7$, AB and PVdF in a second slurry was changed to 87 parts by mass: 13 parts by mass: 5 parts by mass.

Example 4

An electrode was produced in a similar manner as in Example 1, except that $TiNb_2O_7$ having an average particle diameter $D_{50}$ of 1.2 μm, according to particle size distribution measurement by laser diffraction, was prepared as active material.

Example 5

An electrode was produced in a similar manner as in Example 1, except that $TiNb_2O_7$ having an average particle diameter $D_{50}$ of 3.0 μm, according to particle size distribution measurement by laser diffraction, was prepared as active material.

Example 6

An electrode was produced in a similar manner as in Example 1, except that $TiNb_2O_7$ having an average particle diameter $D_{50}$ of 3.5 μm, according to particle size distribution measurement by laser diffraction, was prepared as active material.

Example 7

An electrode was produced in a similar manner as in Example 1 except that $TiNb_2O_7$ similar to that prepared in Example 1 was made into secondary particles, and then, used as active material. Measurement of particle size distribution by laser diffraction showed that the $TiNb_2O_7$ secondary particles had an average particle diameter $D_{50}$ of 10.8 μm.

Example 8

$TiNb_{1.95}Fe_{0.05}O_7$ was prepared. Measurement of particle size distribution by laser diffraction showed that the prepared $TiNb_{1.95}Fe_{0.05}O_7$ had an average particle diameter $D_{50}$ of 2.1 μm. An electrode was produced in a similar manner as in Example 1, except that the $TiNb_{1.95}Fe_{0.05}O_7$ was made into secondary particles, and then, used as active material. Measurement of particle size distribution by laser diffraction showed that the $TiNb_{1.95}Fe_{0.05}O_7$ secondary particles had an average particle diameter $D_{50}$ of 10.5 μm.

Example 9

$TiNb_{1.95}Ta_{0.05}O_7$ was prepared. Measurement of particle size distribution by laser diffraction showed that the prepared $TiNb_{1.95}Ta_{0.05}O_7$ had an average particle diameter $D_{50}$ of 2.1 μm. An electrode was produced in a similar manner as in Example 1, except that the $TiNb_{1.95}Ta_{0.05}O_7$ was made into secondary particles, and then, used as active material. Measurement of particle size distribution by laser diffraction showed that the $TiNb_{1.95}Ta_{0.05}O_7$ secondary particles had an average particle diameter $D_{50}$ of 10.6 μm.

Example 10

$TiNb_{1.95}Mo_{0.05}O_7$ was prepared. Measurement of particle size distribution by laser diffraction showed that the prepared $TiNb_{1.95}Mo_{0.05}O_7$ had an average particle diameter $D_{50}$ of 2.4 μm. An electrode was produced in a similar manner as in Example 1, except that the $TiNb_{1.95}Mo_{0.05}O_7$ was made into secondary particles, and then, used as active material. Measurement of particle size distribution by laser diffraction analysis showed that the $TiNb_{1.95}Mo_{0.05}O_7$ secondary particles had an average particle diameter $D_{50}$ of 11.4 μm.

Example 11

$Li_2Na_{1.8}Ti_{5.8}Nb_{0.2}O_{14}$ was prepared. Measurement of particle size distribution by laser diffraction showed that the prepared $Li_2Na_{1.8}Ti_{5.8}Nb_{0.2}O_{14}$ had an average particle diameter $D_{50}$ of 2.2 μm. An electrode was produced in a similar manner as in Example 1, except that the $Li_2Na_{1.8}Ti_{5.8}Nb_{0.2}O_{14}$ was made into secondary particles, and then, used as active material. Measurement of particle size distribution by laser diffraction showed that the $Li_2Na_{1.8}Ti_{5.8}Nb_{0.2}O_{14}$ secondary particles had an average particle diameter $D_{50}$ of 10.3 μm.

Example 12

An electrode was produced in a similar manner as in Example 10 except that $TiNb_{1.95}Mo_{0.05}O_7$ was used as active material without being made into secondary particles.

Example 13

An electrode was produced in a similar manner as in Example 11, except that $Li_2Na_{1.8}Ti_{5.8}Nb_{0.2}O_{14}$ was used as active material, without being made into secondary particles.

Example 14

As an electro-conductive agent, graphite was prepared together with acetylene black. A first slurry was prepared by adding $TiNb_2O_7$ (active material), acetylene black (electro-conductive agent), graphite (electro-conductive agent) and PVdF (binder) at a mixing ratio of 90 parts by mass: 4 parts by mass: 1 part by mass: 5 parts by mass into N-methylpyrrolidone (NMP) as solvent, and mixing. A second slurry was prepared in a similar manner to the first slurry except that $TiNb_2O_7$ (active material), acetylene black (electro-conductive agent), graphite (electro-conductive agent) and PVdF (binder) were added at a mixing ratio of 80 parts by mass: 12 parts by mass: 3 parts by mass: 5 parts by mass. An electrode was produced in a similar manner as in Example 1 except that a composition of each slurry was changed as described above.

Example 15

An electrode was produced in a similar manner as in Example 14, except that carbon nanotubes (CNT) were used in place of graphite.

Example 16

An electrode was produced in a similar manner as in Example 14, except that graphene was used in place of graphite.

Example 17

An electrode was produced in a similar manner as in Example 7, using $TiNb_2O_7$ secondary particles as active material, except that a beads mill dispersion apparatus was used instead of a planetary centrifugal mixer for dispersion of each slurry.

Example 18

As active material, prepared was $TiNb_2O_7$ similar to that in Example 7, for which the average particle diameter $D_{50}$ after being made into secondary particles was 10.8 μm. As an electro-conductive agent, graphite was prepared together with acetylene black. A first slurry was prepared by adding $TiNb_2O_7$ (active material), acetylene black (electro-conductive agent), graphite (electro-conductive agent) and PVdF (binder) at a mixing ratio of 90 parts by mass: 4 parts by mass: 1 part by mass: 5 parts by mass into N-methylpyrrolidone (NMP) as solvent, and then mixing. A second slurry was prepared in a manner similar to the first slurry, except that $TiNb_2O_7$ (active material), acetylene black (electro-conductive agent), graphite (electro-conductive agent) and PVdF (binder) were added at a mixing ratio of 80 parts by mass: 12 parts by mass: 3 parts by mass: 5 parts by mass. An electrode was produced in a similar manner as in Example 17, except that a composition of each slurry was changed as described above.

Example 19

An electrode was produced in a similar manner as in Example 18, except that carbon nanotubes (CNT) were used in place of graphite.

Example 20

An electrode was produced in a similar manner as in Example 18, except that graphene was used in place of graphite.

Example 21

In the following manner, an electrode was produced by a "twice application, twice press" method where, a first slurry was applied and rolled, and thereafter, the first slurry was applied again as second slurry and rolled.

As active material, $TiNb_2O_7$ secondary particles having an average particle diameter $D_{50}$ of 10.8 μm were prepared. Acetylene black (AB) and polyvinylidene fluoride (PVdF) were respectively prepared as electro-conductive agent and binder. $TiNb_2O_7$, AB and PVdF were added at a mixing ratio of 90 parts by mass: 5 parts by mass: 5 parts by mass to N-methylpyrrolidone (NMP) as a solvent, and mixed. Next, the resulting mixture was dispersed with a planetary centrifugal mixer to yield the first slurry.

The first slurry was applied onto one face of a current collector made of aluminum foil having a thickness of 15 μm. An amount of application was 50 g/m² per area of the current collector. Then, the applied coat was dried. Next, the resulting stack was pressed with a fixed-pressure roll press apparatus to form a layer having a density of 2.55 g/cm³ on the current collector.

Subsequently, on top of the layer formed on the current collector, the first slurry was reapplied. In the reapplication, the first slurry was applied at an amount such that the total amount of applied coat on the current collector combining the first application and second application was 100 g/m². The re-applied slurry was dried so as to yield a stack of the current collector and a layer containing the active material. Next, the obtained stack was pressed with a fixed-pressure roll press apparatus to produce an electrode provided with an active material-containing layer having an overall density of 2.5 g/cm³.

Example 22

An electrode was produced in a similar manner as in Example 21, except that $TiNb_2O_7$ primary particles having an average particle diameter $D_{50}$ of 2.2 μm, according to measurement of particle size distribution by laser diffraction, were prepared as active material.

Example 23

Monoclinic titanium niobium oxide $TiNb_2O_7$ was prepared as active material. Measurement of particle size distribution by laser diffraction showed that the prepared $TiNb_2O_7$ had an average particle diameter $D_{50}$ of 2.2 μm. Acetylene black (AB) was prepared as electro-conductive agent. Carboxymethyl cellulose (CMC) and styrene butadiene rubber (SBR) were prepared as binders. Using water as solvent, $TiNb_2O_7$ (active material), AB (electro-conductive agent), CMC (binder) and SBR were dispersed with a planetary centrifugal mixer at a mixing ratio of 90 parts by mass: 6 parts by mass: 2 parts by mass: 2 parts by mass so as to, yield a first slurry.

A second slurry was prepared in a similar manner as the first slurry except that a mixing ratio of $TiNb_2O_7$ (active material), AB (electro-conductive agent), CMC (binder) and SBR (binder) was changed to 80 parts by mass: 15 parts by mass: 2.5 parts by mass: 2.5 parts by mass.

An electrode was produced in a similar manner as in Example 1 except that a composition of each slurry was changed as described above.

Example 24

An electrode was produced in a similar manner as in Example 23, except that in the second slurry, the mixing ratio of $TiNb_2O_7$ (active material), AB (electro-conductive agent), CMC (binder) and SBR (binder) was changed to 83 parts by mass: 17 parts by mass: 2.5 parts by mass: 2.5 parts by mass.

Example 25

An electrode was produced in a similar manner as in Example 23, except that in the second slurry, the mixing ratio of $TiNb_2O_7$ (active material), AB (electro-conductive agent), CMC (binder) and SBR (binder) was changed to 87 parts by mass: 13 parts by mass: 2.5 parts by mass: 2.5 parts by mass.

Comparative Example 1

(Preparation of Slurry)

As a first slurry, a slurry having a composition similar to the second slurry prepared in Example 1 was prepared. As a second slurry, a slurry having a composition similar to the first slurry prepared in Example 1 was prepared.

(Application and Drying of Slurry)

The first slurry (analogous to second slurry in Example 1) was applied onto one face of a current collector made of aluminum foil having a thickness of 15 μm. An amount of application was 50 g/m² per area of the current collector. Then, the applied coat was dried. Next, the second slurry (analogous to first slurry in Example 1) was applied on top of the obtained coat. The second slurry was applied in an amount such that the total amount of applied coat on the current collector was 100 g/m². The applied coat of second slurry was dried so as to yield a stack of the current collector and a layer containing the active material.

(Roll Pressing)

Next, the obtained stack was pressed with a fixed-pressure roll press apparatus to produce an electrode provided with an active material-containing layer having a density of 2.5 g/cm³.

Comparative Example 2

An electrode was produced in a similar manner as in Example 1, except that in the second slurry, the mixing ratio of $TiNb_2O_7$, AB, and PVdF was changed to 75 parts by mass: 15 parts by mass: 10 parts by mass.

Comparative Example 3

An electrode was produced in a similar manner as in Example 1, except that $TiNb_2O_7$ primary particles having an average particle diameter $D_{50}$ of 0.4 μm, according to measurement of particle size distribution by laser diffraction, were prepared as active material.

Comparative Example 4

An electrode was produced in a similar manner as in Example 1, except that $TiNb_2O_7$ primary particles having an average particle diameter $D_{50}$ of 6.7 μm, according to measurement of particle size distribution by laser diffraction, were prepared as active material.

The following Tables 1 to 4 show details of the slurries used for production of the electrodes in Examples 1 to 25 and Comparative Examples 1 to 4. Specifically, Tables 1 and 2 summarize details of each first slurry such as composition of active material, average primary particle diameter and average secondary particle diameter of active material, specifically, of titanium-niobium composite oxide among active materials, electro-conductive agent, binder and dispersion apparatus used for slurry dispersion. Tables 3 and 4 similarly summarize details of each second slurry. In examples where the titanium-niobium composite oxide used as active material was in the form of primary particles, the "average secondary particle diameter" is inapplicable; therefore, for those examples, the respective column is marked as "-". In each of Examples 21 and 22, the first slurry was applied twice without using a second slurry having a composition different from that of the first slurry. Accordingly, with regard to Example 21 and Example 22, Table 4 shows details of the reapplied first slurry instead of a second slurry.

TABLE 1

| | | First slurry | | | | |
|---|---|---|---|---|---|---|
| | Active material composition (parts by mass) | Ti—Nb active material average primary particle diameter (μm) | Ti—Nb active material average secondary particle diameter (μm) | Electro-conductive agent (parts by mass) | Binder (parts by mass) | Dispersion apparatus |
| Example 1 | $TiNb_2O_7$ (90) | 2.2 | — | AB (5) | PVdF (5) | Planetary centrifugal mixer |
| Example 2 | $TiNb_2O_7$ (90) | 2.2 | — | AB (5) | PVdF (5) | Planetary centrifugal mixer |
| Example 3 | $TiNb_2O_7$ (90) | 2.2 | — | AB (5) | PVdF (5) | Planetary centrifugal mixer |
| Example 4 | $TiNb_2O_7$ (90) | 1.2 | — | AB (5) | PVdF (5) | Planetary centrifugal mixer |
| Example 5 | $TiNb_2O_7$ (90) | 3.0 | — | AB (5) | PVdF (5) | Planetary centrifugal mixer |

TABLE 1-continued

| | First slurry | | | | | |
|---|---|---|---|---|---|---|
| | Active material composition (parts by mass) | Ti—Nb active material average primary particle diameter (μm) | Ti—Nb active material average secondary particle diameter (μm) | Electro-conductive agent (parts by mass) | Binder (parts by mass) | Dispersion apparatus |
| Example 6 | $TiNb_2O_7$ (90) | 3.5 | — | AB (5) | PVdF (5) | Planetary centrifugal mixer |
| Example 7 | $TiNb_2O_7$ (90) | 2.2 | 10.8 | AB (5) | PVdF (5) | Planetary centrifugal mixer |
| Example 8 | $TiNb_{1.95}Fe_{0.05}O_7$ (90) | 2.1 | 10.5 | AB (5) | PVdF (5) | Planetary centrifugal mixer |
| Example 9 | $TiNb_{1.95}Fe_{0.05}O_7$ (90) | 2.1 | 10.6 | AB (5) | PVdF (5) | Planetary centrifugal mixer |
| Example 10 | $TiNb_{1.95}Mo_{0.05}O_7$ (90) | 2.4 | 11.4 | AB (5) | PVdF (5) | Planetary centrifugal mixer |
| Example 11 | $Li_2Na_{1.8}Ti_{5.8}Nb_{0.2}O_{14}$ (90) | 2.2 | 10.3 | AB (5) | PVdF (5) | Planetary centrifugal mixer |
| Example 12 | $TiNb_{1.95}Mo_{0.05}O_7$ (90) | 2.4 | — | AB (5) | PVdF (5) | Planetary centrifugal mixer |
| Example 13 | $Li_2Na_{1.8}Ti_{5.8}Nb_{0.2}O_{14}$ (90) | 2.2 | — | AB (5) | PVdF (5) | Planetary centrifugal mixer |
| Example 14 | $TiNb_2O_7$ (90) | 2.2 | — | AB; graphite (4; 1) | PVdF (5) | Planetary centrifugal mixer |
| Example 15 | $TiNb_2O_7$ (90) | 2.2 | — | AB; CNT (4; 1) | PVdF (5) | Planetary centrifugal mixer |
| Example 16 | $TiNb_2O_7$ (90) | 2.2 | — | AB; graphene (4; 1) | PVdF (5) | Planetary centrifugal mixer |

TABLE 2

| | First slurry | | | | | |
|---|---|---|---|---|---|---|
| | Active material composition (parts by mass) | Ti—Nb active material average primary particle diameter (μm) | Ti—Nb active material average secondary particle diameter (μm) | Electro-conductive agent (parts by mass) | Binder (parts by mass) | Dispersion apparatus |
| Example 17 | $TiNb_2O_7$ (90) | 2.2 | 10.8 | AB (5) | PVdF (5) | Beads mill |
| Example 18 | $TiNb_2O_7$ (90) | 2.2 | 10.8 | AB; graphite (4; 1) | PVdF (5) | Beads mill |
| Example 19 | $TiNb_2O_7$ (90) | 2.2 | 10.8 | AB; CNT (4; 1) | PVdF (5) | Beads mill |
| Example 20 | $TiNb_2O_7$ (90) | 2.2 | 10.8 | AB; graphene (4; 1) | PVdF (5) | Beads mill |
| Example 21 | $TiNb_2O_7$ (90) | 2.2 | 10.8 | AB (5) | PVdF (5) | Planetary centrifugal mixer |
| Example 22 | $TiNb_2O_7$ (90) | 2.2 | — | AB (5) | PVdF (5) | Planetary centrifugal mixer |
| Example 23 | $TiNb_2O_7$ (90) | 2.2 | — | AB (6) | CMC; SBR (2; 2) | Planetary centrifugal mixer |
| Example 24 | $TiNb_2O_7$ (90) | 2.2 | — | AB (6) | CMC; SBR (2; 2) | Planetary centrifugal mixer |
| Example 25 | $TiNb_2O_7$ (90) | 2.2 | — | AB (6) | CMC; SBR (2; 2) | Planetary centrifugal mixer |

TABLE 2-continued

| | First slurry | | | | | |
|---|---|---|---|---|---|---|
| | Active material composition (parts by mass) | Ti—Nb active material average primary particle diameter (μm) | Ti—Nb active material average secondary particle diameter (μm) | Electro-conductive agent (parts by mass) | Binder (parts by mass) | Dispersion apparatus |
| Comparative Example 1 | TiNb$_2$O$_7$ (80) | 2.2 | — | AB (15) | PVdF (5) | Planetary centrifugal mixer |
| Comparative Example 2 | TiNb$_2$O$_7$ (90) | 2.2 | — | AB (5) | PVdF (5) | Planetary centrifugal mixer |
| Comparative Example 3 | TiNb$_2$O$_7$ (90) | 0.4 | — | AB (5) | PVdF (5) | Planetary centrifugal mixer |
| Comparative Example 4 | TiNb$_2$O$_7$ (90) | 6.7 | — | AB (5) | PVdF (5) | Planetary centrifugal mixer |

TABLE 3

| | Second slurry | | | | | |
|---|---|---|---|---|---|---|
| | Active material composition (parts by mass) | Ti—Nb active material average primary particle diameter (μm) | Ti—Nb active material average secondary particle diameter (μm) | Electro-conductive agent (parts by mass) | Binder (parts by mass) | Dispersion apparatus |
| Example 1 | TiNb$_2$O$_7$ (80) | 2.2 | — | AB (15) | PVdF (5) | Planetary centrifugal mixer |
| Example 2 | TiNb$_2$O$_7$ (83) | 2.2 | — | AB (17) | PVdF (5) | Planetary centrifugal mixer |
| Example 3 | TiNb$_2$O$_7$ (87) | 2.2 | — | AB (13) | PVdF (5) | Planetary centrifugal mixer |
| Example 4 | TiNb$_2$O$_7$ (80) | 1.2 | — | AB (15) | PVdF (5) | Planetary centrifugal mixer |
| Example 5 | TiNb$_2$O$_7$ (80) | 3.0 | — | AB (15) | PVdF (5) | Planetary centrifugal mixer |
| Example 6 | TiNb$_2$O$_7$ (80) | 3.5 | — | AB (15) | PVdF (5) | Planetary centrifugal mixer |
| Example 7 | TiNb$_2$O$_7$ (80) | 2.2 | 10.8 | AB (15) | PVdF (5) | Planetary centrifugal mixer |
| Example 8 | TiNb$_{1.95}$Fe$_{0.05}$O$_7$ (80) | 2.1 | 10.5 | AB (15) | PVdF (5) | Planetary centrifugal mixer |
| Example 9 | TiNb$_{1.95}$Ta$_{0.05}$O$_7$ (80) | 2.1 | 10.6 | AB (15) | PVdF (5) | Planetary centrifugal mixer |
| Example 10 | TiNb$_{1.95}$Mo$_{0.05}$O$_7$ (80) | 2.4 | 11.4 | AB (15) | PVdF (5) | Planetary centrifugal mixer |
| Example 11 | Li$_2$Na$_{1.8}$Ti$_{5.8}$Nb$_{0.2}$O$_{14}$ (80) | 2.2 | 10.3 | AB (15) | PVdF (5) | Planetary centrifugal mixer |
| Example 12 | TiNb$_{1.95}$Mo$_{0.05}$O$_7$ (80) | 2.4 | — | AB (15) | PVdF (5) | Planetary centrifugal mixer |
| Example 13 | Li$_2$Na$_{1.8}$Ti$_{5.8}$Nb$_{0.2}$O$_{14}$ (80) | 2.2 | — | AB (15) | PVdF (5) | Planetary centrifugal mixer |
| Example 14 | TiNb$_2$O$_7$ (80) | 2.2 | — | AB; graphite (12; 3) | PVdF (5) | Planetary centrifugal mixer |
| Example 15 | TiNb$_2$O$_7$ (80) | 2.2 | — | AB; CNT (12; 3) | PVdF (5) | Planetary centrifugal mixer |

TABLE 3-continued

|  | Second slurry | | | | | |
|---|---|---|---|---|---|---|
|  | Active material composition (parts by mass) | Ti—Nb active material average primary particle diameter (μm) | Ti—Nb active material average secondary particle diameter (μm) | Electro-conductive agent (parts by mass) | Binder (parts by mass) | Dispersion apparatus |
| Example 16 | TiNb$_2$O$_7$ (80) | 2.2 | — | AB; graphene (12; 3) | PVdF (5) | Planetary centrifugal mixer |

TABLE 4

|  | Second slurry | | | | | |
|---|---|---|---|---|---|---|
|  | Active material composition (parts by mass) | Ti—Nb active material average primary particle diameter (μm) | Ti—Nb active material average secondary particle diameter (μm) | Electro-conductive agent (parts by mass) | Binder (parts by mass) | Dispersion apparatus |
| Example 17 | TiNb$_2$O$_7$ (80) | 2.2 | 10.8 | AB (15) | PVdF (5) | Beads mill |
| Example 18 | TiNb$_2$O$_7$ (80) | 2.2 | 10.8 | AB; graphite (12; 3) | PVdF (5) | Beads mill |
| Example 19 | TiNb$_2$O$_7$ (80) | 2.2 | 10.8 | AB; CNT (12; 3) | PVdF (5) | Beads mill |
| Example 20 | TiNb$_2$O$_7$ (80) | 2.2 | 10.8 | AB; graphene (12; 3) | PVdF (5) | Beads mill |
| Example 21 | TiNb$_2$O$_7$ (90) | 2.2 | 10.8 | AB (5) | PVdF (5) | Planetary centrifugal mixer |
| Example 22 | TiNb$_2$O$_7$ (90) | 2.2 | — | AB (5) | PVdF (5) | Planetary centrifugal mixer |
| Example 23 | TiNb$_2$O$_7$ (80) | 2.2 | — | AB (15) | CMC; SBR (2.5; 2.5) | Planetary centrifugal mixer |
| Example 24 | TiNb$_2$O$_7$ (83) | 2.2 | — | AB (17) | CMC; SBR (2.5; 2.5) | Planetary centrifugal mixer |
| Example 25 | TiNb$_2$O$_7$ (87) | 2.2 | — | AB (13) | CMC; SBR (2.5; 2.5) | Planetary centrifugal mixer |
| Comparative Example 1 | TiNb$_2$O$_7$ (90) | 2.2 | — | AB (5) | PVdF (5) | Planetary centrifugal mixer |
| Comparative Example 2 | TiNb$_2$O$_7$ (75) | 2.2 | — | AB (15) | PVdF (10) | Planetary centrifugal mixer |
| Comparative Example 3 | TiNb$_2$O$_7$ (80) | 0.4 | — | AB (15) | PVdF (5) | Planetary centrifugal mixer |
| Comparative Example 4 | TiNb$_2$O$_7$ (80) | 6.7 | — | AB (15) | PVdF (5) | Planetary centrifugal mixer |

[Measurement of Area Ratio Occupied by Titanium-niobium Composite Oxide]

For each of the electrodes produced in Examples 1 to 25 and Comparative Examples 1 to 4, area ratios S1 and S2 occupied by titanium-niobium composite oxide in corresponding regions of each active material-containing layer were measured by the aforementioned procedure, thereby obtaining S2/S1.

[Measurement of Particle Diameter Frequency Distribution]

For each electrode, a particle diameter frequency distribution of titanium-niobium composite oxide particles was obtained by the aforementioned procedure. A particle diameter corresponding to the maximum peak in the obtained particle diameter distribution was examined.

[Measurement of Pore Diameter Distribution]

For each electrode, a pore diameter distribution was measured according to mercury porosimetry by the aforementioned procedure. Based on the resulting pore diameter distribution spectrum, obtained were a pore diameter A corresponding to the maximum peak in the pore diameter distribution for the whole active material-containing layer, a pore diameter B corresponding to the maximum peak in the pore diameter distribution in the half of the active material-containing layer closer to the current collector and a ratio A/B of the pore diameters.

The following Table 5 summarizes the measurement results for each of the electrodes produced in Examples 1 to 25 and Comparative Examples 1 to 4. In addition, Table 5 shows a method for producing each electrode. Specifically, Table 5 shows whether each electrode was produced by the "twice application, single press" method or the "twice application, twice press" method, and Table 5 also shows area ratios S1 and S2 occupied by titanium-niobium composite oxide in the half closer to a current collector and in the other half of the active material-containing layer, a ratio S2/S1 thereof, a position (particle diameter) of the maximum peak in a particle diameter frequency distribution of titanium-niobium composite oxide particles in the active material-containing layer, a position (pore diameter) A of the maximum peak in a pore diameter distribution for the whole active material-containing layer, a position (pore diameter) B of the maximum peak in the half of the active material-containing layer closer to the current collector and a ratio of the pore diameters A/B.

Examples 1 to 4 were used as working electrodes. Lithium metal was used for a counter electrode and a reference electrode. A mixed solvent of ethylene carbonate (EC) and diethyl carbonate (DEC) with $LiPF_6$ dissolved therein was used as a nonaqueous electrolyte. A volume ratio of EC and DEC in the mixed solvent was 1:2. A concentration of $LiPF_6$ was 1.0 mol/L.

The life performance was evaluated in the following manner. First, the evaluation cell was charged at a current value of 1 C until a potential of the working electrode reached 1.0 V (vs. $Li/Li^+$). After the potential reached 1.0 V (vs. $Li/Li^+$), the evaluation cell was further charged while maintaining this potential until a current value reached 0.05 C. After the current value reached 0.05 C, the evaluation cell was discharged at a current value of 1 C until the potential reached 3.0 V (vs. $Li/Li^+$). A discharge capacity upon discharging until the potential reached 3.0 V (vs. $Li/Li^+$) was measured, thereby obtaining a discharge capacity $C_1$ of the first cycle. Regarding this process as one cycle, charge and

TABLE 5

|  | Production method of electrode | S1 (%) | S2 (%) | S2/S1 | Position of greatest peak in particle diameter distribution (μm) | A (μm) | B (μm) | A/B |
|---|---|---|---|---|---|---|---|---|
| Example 1 | twice application, single press | 52.9 | 42.9 | 0.81 | 1.6 | 0.18 | 0.1 | 1.80 |
| Example 2 | twice application, single press | 52.8 | 46 | 0.87 | 1.5 | 0.16 | 0.11 | 1.45 |
| Example 3 | twice application, single press | 52.9 | 51.8 | 0.98 | 1.6 | 0.1 | 0.11 | 0.91 |
| Example 4 | twice application, single press | 51.6 | 47.5 | 0.92 | 0.6 | 0.12 | 0.09 | 1.33 |
| Example 5 | twice application, single press | 53.2 | 49.5 | 0.93 | 2.1 | 0.15 | 0.1 | 1.50 |
| Example 6 | twice application, single press | 53.3 | 48 | 0.9 | 2.8 | 0.2 | 0.15 | 1.33 |
| Example 7 | twice application, single press | 53.1 | 45.2 | 0.85 | 1.7 | 0.3 | 0.26 | 1.15 |
| Example 8 | twice application, single press | 52.6 | 45.3 | 0.86 | 1.6 | 0.28 | 0.24 | 1.17 |
| Example 9 | twice application, single press | 52.6 | 43.2 | 0.82 | 1.5 | 0.25 | 0.24 | 1.04 |
| Example 10 | twice application, single press | 53.5 | 47.1 | 0.88 | 1.9 | 0.33 | 0.3 | 1.10 |
| Example 11 | twice application, single press | 52.7 | 44.3 | 0.84 | 1.6 | 0.41 | 0.36 | 1.14 |
| Example 12 | twice application, single press | 53.2 | 47.4 | 0.89 | 1.9 | 0.28 | 0.2 | 1.40 |
| Example 13 | twice application, single press | 52.4 | 44.6 | 0.85 | 1.5 | 0.26 | 0.22 | 1.18 |
| Example 14 | twice application, single press | 52.1 | 43.3 | 0.83 | 1.7 | 0.15 | 0.15 | 1.00 |
| Example 15 | twice application, single press | 53.9 | 43.8 | 0.81 | 1.6 | 0.14 | 0.11 | 1.27 |
| Example 16 | twice application, single press | 53.3 | 43.3 | 0.81 | 1.5 | 0.17 | 0.15 | 1.13 |
| Example 17 | twice application, single press | 52 | 42.1 | 0.81 | 1.3 | 0.23 | 0.22 | 1.05 |
| Example 18 | twice application, single press | 51.8 | 42.2 | 0.81 | 1.4 | 0.2 | 0.18 | 1.11 |
| Example 19 | twice application, single press | 52.5 | 43.1 | 0.82 | 1.2 | 0.2 | 0.15 | 1.33 |
| Example 20 | twice application, single press | 52.3 | 43.9 | 0.84 | 1.3 | 0.24 | 0.23 | 1.04 |
| Example 21 | twice application, twice press | 52 | 49.5 | 0.95 | 2 | 0.31 | 0.23 | 1.35 |
| Example 22 | twice application, twice press | 52.2 | 47.6 | 0.91 | 1.2 | 0.18 | 0.09 | 2.00 |
| Example 23 | twice application, single press | 51.8 | 42 | 0.81 | 1.6 | 0.18 | 0.1 | 1.80 |
| Example 24 | twice application, single press | 51.6 | 45 | 0.87 | 1.5 | 0.16 | 0.11 | 1.45 |
| Example 25 | twice application, single press | 51.8 | 50.8 | 0.98 | 1.6 | 0.1 | 0.11 | 0.91 |
| Comparative Example 1 | twice application, single press | 45.9 | 52.5 | 1.14 | 1.5 | 0.12 | 0.16 | 0.75 |
| Comparative Example 2 | twice application, single press | 53.1 | 40.2 | 0.76 | 1.4 | 0.23 | 0.12 | 1.92 |
| Comparative Example 3 | twice application, single press | 52 | 44.2 | 0.85 | 0.4 | 0.23 | 0.17 | 1.35 |
| Comparative Example 4 | twice application, single press | 53.6 | 47.2 | 0.88 | 3.2 | 0.7 | 0.66 | 1.06 |

[Evaluation]
(Charge-Discharge Test)

For each electrode produced in Examples 1 to 25 and Comparative Examples 1 to 4, an evaluation cell was prepared in the following manner, so as to evaluate life performance.

A three-electrode cell was used as the evaluation cell. The electrodes obtained in Examples 1 to 25 and Comparative discharge were repeated for 50 cycles in total. Charge and discharge in each cycle was performed under a temperature of 45° C. A discharge capacity at the 50th cycle was measured to obtain a discharge capacity $C_{50}$.

The discharge capacity $C_{50}$ was divided by the discharge capacity $C_1$ to obtain a capacity retention ratio of the 50th cycle [$=(C_{50}/C_1) \times 100\%$]. Results are shown in Table 6.

TABLE 6

| | Capacity retention ratio (%) |
|---|---|
| Example 1 | 80 |
| Example 2 | 78 |
| Example 3 | 75 |
| Example 4 | 83 |
| Example 5 | 84 |
| Example 6 | 85 |
| Example 7 | 79 |
| Example 8 | 80 |
| Example 9 | 81 |
| Example 10 | 80 |
| Example 11 | 78 |
| Example 12 | 82 |
| Example 13 | 80 |
| Example 14 | 83 |
| Example 15 | 88 |
| Example 16 | 86 |
| Example 17 | 79 |
| Example 18 | 80 |
| Example 19 | 84 |
| Example 20 | 82 |
| Example 21 | 80 |
| Example 22 | 82 |
| Example 23 | 85 |
| Example 24 | 83 |
| Example 25 | 80 |
| Comparative Example 1 | 71 |
| Comparative Example 2 | 68 |
| Comparative Example 3 | 69 |
| Comparative Example 4 | 73 |

In Examples 1 to 3 and Comparative Examples 1 and 2, the content ratio of titanium-niobium composite oxide differ between a first thickness region on the side of the current collector foil in each active material-containing layer and a second thickness region not facing the current collector foil. In Comparative Example 1 and Comparative Example 2, S2/S1 is 1.14 and 0.76, which is beyond the range of 0.8<S2/S1<1. As described above, charge and discharge reactions more readily proceed for an electrode active material in the second thickness region, than for an electrode active material in the first thickness region. In Comparative Example 1, the first thickness region had a low proportion of the titanium-niobium composite oxide, whereby S2/S1 exceeds 1; it is therefore considered that charge and discharge reactions was facilitated on the side not facing the current collector foil, making the reaction distribution uneven. It is suspected that due to the reaction distribution being uneven, deterioration was promoted at sections where load was large. With regard to Comparative Example 2, although the first thickness region had a high proportion of the titanium-niobium composite oxide, the proportion was excessively high; therefore, it is suspected that reactions had concentrated in the first thickness region, causing generation of cracks between particles and deterioration of contact with the current collector foil.

The results of Examples 4 to 6 and Comparative Examples 3 and 4 show that there is difference in performance depending on particle diameters corresponding to maximum peaks in a particle diameter distribution obtained as a result of binarization, that is, mode diameters in the active material-containing layer. The maximum peaks in the particle diameter distribution were at 0.6 μm in Example 4 and at 0.4 μm in Comparative Example 3. Capacity retention ratios upon performing 50 cycles of charge and discharge were 83% in Example 4 and 69% in Comparative Example 3. Although S2/S1 in Comparative Example 3 was 0.85, it is inferred that the particle sizes of the titanium-niobium composite oxide particles in the active material-containing layer was small, which made it difficult to maintain the electronic conduction path inside the electrode. Comparing Examples 5 and 6 with Comparative Example 4, in Examples 5 and 6, the maximum peaks of the particle diameter distribution were 2.1 μm and 2.8 μm, and the capacity retention ratios were 84% and 85%, respectively. However, in Comparative Example 4, the maximum peak of the particle diameter distribution was 3.2 μm, and the capacity retention ratio was 73%. It is inferred that this is due to reactions in the electrode being apt to be uneven, also for cases where the particle diameter is large.

Examples 7 to 13 employed a titanium-niobium composite oxide granulated into secondary particles or a titanium-niobium composite oxide having a different elemental composition. Regardless of particle morphology and elemental compositions, an electrode having S2/S1 satisfying 0.8<S2/S1<1 and a maximum peak position in the particle diameter distribution in the range of 0.5 μm to 3 μm showed good cycle performance.

In Examples 14 to 22, although the electro-conductive agent, dispersion method, and method for producing the electrode were different, an electrode having S2/S1 satisfying 0.8<S2/S1<1 and a maximum peak position in the particle diameter distribution in the range of 0.5 μm to 3 μm showed good cycle performance. Cycle performance was particularly high in electrodes using CNT and graphene.

In Examples 23 to 25, an electrode was produced using an aqueous coating liquid, but an electrode having S2/S1 satisfying 0.8<S2/S1<1 and a maximum peak position in the particle diameter distribution in the range of 0.5 μm to 3 μm showed good cycle performance.

Nonaqueous electrolyte batteries were produced and evaluated in the following manner.

Example 26

[Production of Positive Electrode]

As positive electrode active material, prepared was a powder of lithium nickel cobalt manganese composite oxide having a composition represented by $LiNi_{0.33}Co_{0.34}Mn_{0.33}O_2$. The lithium nickel cobalt manganese composite oxide powder was a secondary particle powder having an average secondary particle diameter of 8 μm.

This lithium nickel cobalt manganese composite oxide powder, acetylene black as electro-conductive agent and polyvinylidene fluoride (PVdF) as binder were added at a mixing ratio of 90 parts by mass: 5 parts by mass: 5 parts by mass to N-methylpyrrolidone (NMP) as a solvent, and mixed. Next, the resulting mixture was dispersed with a planetary centrifugal mixer to prepare a slurry.

Next, the prepared slurry was applied onto both surfaces of a current collector made of aluminum foil having a thickness of 15 μm. An amount of application per side of the current collector was 130 g/m². Next, the applied coat was dried and pressed, thereby producing a positive electrode including a positive electrode active material-containing layer with a density of 3.0 g/cm³.

[Production of Negative Electrode]

In the following manner, a negative electrode was produced in a similar manner as the electrode produced in Example 1 except that an active material-containing layer was formed on both sides of the current collector.

(Preparation of Slurry)

Described is preparation of a first slurry. Monoclinic titanium niobium oxide $TiNb_2O_7$ was prepared as an active material. Measurement of particle size distribution by laser diffraction showed that the prepared $TiNb_2O_7$ had an average particle diameter $D_{50}$ of 2.2 μm. Acetylene black (AB) and polyvinylidene fluoride (PVdF) were respectively prepared as electro-conductive agent and binder. $TiNb_2O_7$, AB and PVdF were added at a mixing ratio of 90 parts by mass: 5 parts by mass: 5 parts by mass into N-methylpyrrolidone (NMP) as solvent, and mixed. Next, the resulting mixture was dispersed with a planetary centrifugal mixer to yield the first slurry.

A second slurry was prepared in a manner similar to the first slurry except that a mixing ratio of $TiNb_2O_7$, AB and PVdF was 80 parts by mass: 15 parts by mass: 5 parts by mass.

(Application and Drying of Slurry)

The first slurry was applied onto both of reverse faces of a current collector made of aluminum foil having a thickness of 15 μm. An amount of application was 50 g/m² per face of the current collector. Then, the applied coat was dried. Next, the second slurry was applied onto the coat obtained on each face by applying and drying the first slurry. The second slurry was applied in an amount such that the total application amount per face of applied coat on the current collector, combining the first slurry and the second slurry, was 100 g/m². The coat of second slurry was dried so as to yield a stack of the current collector and a layer containing the active material.

(Roll Pressing)

Next, the obtained stack was pressed with a fixed-pressure roll press apparatus to produce a negative electrode provided with a negative electrode active material-containing layer having a density of 2.5 g/cm³.

[Production of Electrode Group]

Two separators made of polyethylene porous film each having a thickness of 25 urn were prepared. Next, the positive electrode, one separator, the negative electrode and the other separator were stacked in this order to obtain a stack. Next, the stack was wound in a spiral shape to obtain a wound member. Next, the wound member was heated and pressed at 90° C.

Accordingly, a flat electrode group having a width of 30 mm, a height of 60 mm, and a thickness of 3.0 mm was produced.

A positive electrode terminal made of aluminum was welded to the positive electrode current collector of the obtained electrode group. In addition, a negative electrode terminal made of aluminum was welded to the negative electrode current collector.

[Housing and Drying of Electrode Group]

A container member made of laminate film was prepared. The laminate film was provided with an aluminum foil having a thickness of 40 μm and a polypropylene layer formed on both surfaces of the aluminum foil. A total thickness of the laminate film was 0.1 mm.

Next, the electrode group was housed in the container member with a part of the positive electrode terminal and a part of the negative electrode terminal placed outside. Next, the periphery of the container was heat-sealed, leaving a part unsealed. In this state, the electrode group was subjected to vacuum drying at 80° C. for 24 hours.

[Preparation of Liquid Nonaqueous Electrolyte]

Propylene carbonate (PC) and diethyl carbonate (DEC) were mixed at a volume ratio of 1:1 to obtain a mixed solvent. $LiPF_6$ as an electrolyte salt was dissolved in this mixed solvent at a concentration of 1 M to prepare a liquid nonaqueous electrolyte.

[Manufacture of Nonaqueous Electrolyte Battery]

The liquid nonaqueous electrolyte was put into the container housing the electrode group as described above. Then, the part in the periphery of the container which had not been heat-sealed was heat-sealed, and the electrode group and the nonaqueous electrolyte were completely sealed within the container member. In this manner, a nonaqueous electrolyte battery having the structure shown in FIG. 4 and having a width of 35 mm, a thickness of 3.2 mm, and a height of 65 mm was manufactured.

Example 27

A battery was manufactured in a similar manner as in Example 26 except that lithium nickel cobalt manganese composite oxide having a composition represented by $LiNi_{0.5}Co_{0.2}Mn_{0.3}O_2$ was used as positive electrode active material instead of the lithium nickel cobalt manganese composite oxide having the composition represented by $LiNi_{0.33}Co_{0.34}Mn_{0.33}O_2$.

Example 28

A battery was manufactured in a similar manner as in Example 26 except that lithium nickel cobalt manganese composite oxide having a composition represented by $LiNi_{0.8}Co_{0.1}Mn_{0.1}O_2$ was used as positive electrode active material instead of the lithium nickel cobalt manganese composite oxide having the composition represented by $LiNi_{0.33}Co_{0.34}Mn_{0.33}O_2$.

Example 29

A battery was manufactured in a similar manner as in Example 26 except that lithium cobaltate having a composition represented by $LiCoO_2$ was used as positive electrode active material instead of the lithium nickel cobalt manganese composite oxide having the composition represented by $LiNi_{0.33}Co_{0.34}M_{0.33}O_2$.

Example 30

A battery was manufactured in a similar manner as in Example 26 except that lithium nickel manganese composite oxide having a composition represented by $LiNi_{0.5}Mn_{1.5}O_4$ was used as positive electrode active material instead of the lithium nickel cobalt manganese composite oxide having the composition represented by $LiNi_{0.33}Co_{0.34}Mn_{0.33}O_2$ and that an amount of slurry applied per surface of current collector was changed to 165 g/m².

Example 31

A battery was manufactured in a similar manner as in Example 26 except that lithium nickel cobalt manganese composite oxide represented by $LiNi_{0.33}Co_{0.34}Mn_{0.33}O_2$ and lithium cobaltate represented by $LiCoO_2$ were mixed at amass ratio of 90:10 to obtain a mixed powder, and the mixed power was used as positive electrode active material.

Comparative Example 5

A positive electrode similar to the positive electrode produced in Example 27 was produced.

In the following manner, a negative electrode was produced in a manner similar to the electrode produced in Comparative Example 1 except that an active material-containing layer was formed on both sides of a current collector.

As a first slurry, a slurry having the same composition as the second slurry prepared in Example 1 was prepared. As a second slurry, a slurry having the same composition as the first slurry prepared in Example 1 was prepared. The first slurry was applied onto both of reverse faces of a current collector made of aluminum foil having a thickness of 15 µm. An amount of application was 50 g/m² per face of the current collector. Then, the applied coat was dried. Next, the second slurry was applied on top of the coat obtained on each face. The second slurry was applied in an amount such that the total amount of applied coat on the current collector was 100 g/m² on each face. The coat of second slurry was dried so as to yield a stack of the current collector and a layer containing the active material. Next, the obtained coats were pressed with a fixed-pressure roll press apparatus to produce a negative electrode provided with a negative electrode active material-containing layer having a density of 2.5 g/cm³.

A battery was manufactured in a manner similar to Example 26 except that the aforementioned positive electrode and negative electrode were used.

Comparative Example 6

A battery was manufactured in a manner similar to Example 26, except that a positive electrode produced in a manner similar to that of the positive electrode in Example 29 and a negative electrode produced in a manner similar to that of the negative electrode in Comparative Example 5 were used.

Comparative Example 7

A battery was manufactured in a similar manner as in Example 26, except that a positive electrode produced in a manner similar to that of the positive electrode in Example 30 and a negative electrode produced in a manner similar to that of the negative electrode in Comparative Example 5 were used.

The following Table 7 summarizes design of each battery manufactured in Examples 26 to 31 and Comparative Examples 5 to 7. Specifically, Table 7 shows composition of positive electrode active material, composition of negative electrode active material, area ratios S1 and S2 occupied by titanium-niobium composite oxide in each cross-section (first cross-section and second cross-section) in the half closer to the current collector and in the other half (first thickness region and second thickness region) of the negative electrode active material-containing layers, ratio S2/S1 thereof, position (particle diameter) of the maximum peak in a particle diameter frequency distribution of titanium-niobium composite oxide particles in the negative electrode active material-containing layer, position (pore diameter) A of the maximum peak in a pore diameter distribution for the whole negative electrode active material-containing layer, position (pore diameter) B of the maximum peak in the half of the negative electrode active material-containing layer closer to the current collector and a ratio A/B thereof.

TABLE 7

| | Positive electrode active material | Negative electrode active material | S1 (%) | S2 (%) | S2/S1 | Peak value of greatest peak in particle diameter distribution (µm) | A/B |
|---|---|---|---|---|---|---|---|
| Example 26 | $LiNi_{0.33}Co_{0.34}Mn_{0.33}O_2$ | $TiNb_2O_7$ | 52.9 | 42.9 | 0.81 | 1.6 | 1.80 |
| Example 27 | $LiNi_{0.5}Co_{0.2}Mn_{0.3}O_2$ | $TiNb_2O_7$ | 52.9 | 42.9 | 0.81 | 1.6 | 1.80 |
| Example 28 | $LiNi_{0.8}Co_{0.1}Mn_{0.1}O_2$ | $TiNb_2O_7$ | 52.9 | 42.9 | 0.81 | 1.6 | 1.80 |
| Example 29 | $LiCoO_2$ | $TiNb_2O_7$ | 52.9 | 42.9 | 0.81 | 1.6 | 1.80 |
| Example 30 | $LiNi_{0.5}Mn_{1.5}O_4$ | $TiNb_2O_7$ | 52.9 | 42.9 | 0.81 | 1.6 | 1.80 |
| Example 31 | $LiNi_{0.33}Co_{0.34}Mn_{0.33}O_2$ + $LiCoO_2$ | $TiNb_2O_7$ | 52.9 | 42.9 | 0.81 | 1.6 | 1.80 |
| Comparative Example 5 | $LiNi_{0.5}Co_{0.2}Mn_{0.3}O_2$ | $TiNb_2O_7$ | 45.9 | 52.5 | 1.14 | 1.5 | 0.75 |
| Comparative Example 6 | $LiCoO_2$ | $TiNb_2O_7$ | 45.9 | 52.5 | 1.14 | 1.5 | 0.75 |
| Comparative Example 7 | $LiNi_{0.5}Mn_{1.5}O_4$ | $TiNb_2O_7$ | 45.9 | 52.5 | 1.14 | 1.5 | 0.75 |

[Evaluation]

(Cycle Life Test)

Each battery manufactured in Examples 26 to 31 and Comparative Examples 5 to 7 was subjected to a cycle life test according to the following procedure. Each battery was charged under a temperature of 45° C. at a constant current of 1 C until a battery voltage reached a charging voltage shown in the following Table 8 for each of the Examples and Comparative Examples. Next, each battery was charged at a constant voltage at the respective charging voltages. Charging was completed when the current converged to a value equivalent to 0.05 C. Then, each battery was left in an open circuit state for 10 minutes. Each battery was then discharged at a constant current of 1 C until the battery voltage reached a final discharge voltage shown in the following Table 8 for each Example and Comparative Example. A set of these series of steps, that is, charging, leaving in an open circuit state and discharging, were defined as one charge-and-discharge cycle. This charge-and-discharge cycle was repeated until 200 cycles were performed. A ratio of a discharge capacity at the 200th cycle to a discharge capacity obtained at the first cycle [=(discharge capacity at 200th cycle/discharge capacity at first cycle)×100%], that is, a capacity retention ratio was calculated as an index of life performance.

The following Table 8 shows charge and discharge voltages and cycle life test results for each battery.

TABLE 8

|  | Charge voltage (V) | End-of-discharge voltage (V) | Capacity retention ratio (%) |
|---|---|---|---|
| Example 26 | 3.0 | 1.5 | 88 |
| Example 27 | 3.0 | 1.5 | 85 |
| Example 28 | 3.0 | 1.5 | 80 |
| Example 29 | 3.0 | 1.5 | 82 |
| Example 30 | 3.7 | 2.0 | 79 |
| Example 31 | 3.0 | 1.5 | 84 |
| Comparative Example 5 | 3.0 | 1.5 | 70 |
| Comparative Example 6 | 3.0 | 1.5 | 72 |
| Comparative Example 7 | 3.7 | 2.0 | 69 |

In each battery manufactured in Examples 26 to 31, a negative electrode having specifications similar to those of the electrode of Example 1 was used. In the negative electrode, as shown in Table 7, S2/S1 satisfied 0.8<S2/S1<1, and a maximum peak position in each particle diameter distribution was in the range of 0.5 μm to 3 μm. In each battery manufactured in Comparative Examples 5 to 7, a negative electrode having specifications similar to those of the electrode of Comparative Example 1 was used, and S2/S1 was beyond the range of 0.8<S2/S1<1. From comparison of the capacity retention ratios shown in Table 8, excellent cycle life performance was confirmed for a battery including a negative electrode that satisfied 0.8<S2/S1<1 and having a maximum peak position in a particle diameter distribution of titanium-niobium composite oxide particles in the range of 0.5 μm to 3 μm.

The electrode according to at least one embodiment and example described above includes a current collector and an active material-containing layer on the current collector. The active material-containing layer includes a cross-section along a stacking direction of the current collector and the active material-containing layer. With regard to a first cross-section corresponding to a first thickness region ranging from the current collector to length 0.5t with respect to a thickness t of the active material-containing layer along the stacking direction among the cross-section, and a second cross-section corresponding to a second thickness region ranging along the stacking direction from length 0.5t to length t from the current collector among the cross-section, a relationship of 0.8<S2/S1<1 is satisfied by an area ratio S1 occupied by the titanium-niobium composite oxide within the first cross-section, and an area ratio S2 occupied by the titanium-niobium composite oxide within the second cross-section. In a particle diameter frequency distribution of particles of the titanium-niobium composite oxide in the cross-section of the active material-containing layer, a peak-top position of a maximum peak is within a range of from 0.5 μm to 3 μm. According to the above electrode, a battery and battery pack exhibiting excellent life performance and a vehicle including the battery pack can be realized.

While certain embodiments of the present invention have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiment described herein may be made without departing from the spirit of the invention. The accompanying claims and their equivalents are intended to cover such embodiments or modifications as would fall within the scope and spirit of the inventions.

What is claimed is:

1. An electrode comprising:
 a current collector; and
 an active material-containing layer comprising a titanium-niobium composite oxide, the active material-containing layer being disposed on the current collector,
 a cross-section of the active material-containing layer along a stacking direction of the current collector and the active material-containing layer comprising a first cross-section and a second cross-section, the first cross-section corresponding to a first thickness region ranging from the current collector to length 0.5t with respect to a thickness t of the active material-containing layer along the stacking direction, the second cross-section corresponding to a second thickness region ranging along the stacking direction from length 0.5t to length t from the current collector, an area ratio S1 occupied by the titanium-niobium composite oxide within the first cross-section, and an area ratio S2 occupied by the titanium-niobium composite oxide within the second cross-section satisfy a relationship 0.8<S2/S1<1, and
 a peak-top position of a maximum peak in a particle diameter frequency distribution of particles of the titanium-niobium composite oxide in the cross-section being within a range of from 0.5 μm to 3 μm.

2. The electrode according to claim 1, wherein the electrode satisfies a relationship A>B, where A represents a pore diameter corresponding to a maximum peak in a pore diameter distribution according to mercury porosimetry in a third thickness region, the third thickness region comprising the first thickness region and the second thickness region, and B represents a pore diameter corresponding to a maximum peak in a pore diameter distribution according to mercury porosimetry in the first thickness region.

3. The electrode according to claim 1, wherein a pore diameter ratio A/B is within a range of 0.9<A/B<2, where A represents a pore diameter corresponding to a maximum peak in a pore diameter distribution according to mercury porosimetry in a third thickness region, the third thickness region comprising the first thickness region and the second thickness region, and B represents a pore diameter corresponding to a maximum peak in a pore diameter distribution according to mercury porosimetry in the first thickness region.

4. The electrode according to claim 1, wherein the titanium-niobium composite oxide comprises a compound represented by $Li_aT_{1-x}M1_xNb_{2-y}M2_yO_{7-\delta}$, where subscript a is within a range of 0≤a<5, subscript x is within a range of 0≤x<1, subscript y is within a range of 0≤y<1, subscript δ is within a range of −0.3≤δ≤0.3, and element M1 and element M2 each comprise at least one selected from the group consisting of Fe, Ni, W, Ta and Mo, the element M1 and the element M2 being same or different with one another.

5. The electrode according to claim 1, wherein the titanium-niobium composite oxide comprises a compound represented by $Li_{2+s}Na_{2-t}M3_uTi_{6-v-e}Nb_vM4_wO_{14+\sigma}$, where subscript s is within a range of 0≤s≤4, subscript t is within a range of 0<t<2, subscript u is within a range of 0≤u<2, subscript v is within a range of 0<v<6, subscript w is within a range of 0≤w<3, a sum of the subscript v and the subscript w is within a range of 0<v+w<6, subscript σ is within a range of −0.5≤σ≤0.5, element M3 is at least one selected from the group consisting of Cs, K, Sr, Ba and Ca, and element M4 is at least one selected from the group consisting of Zr, Sn, V, Ta, Mo, W, Fe, Mn and Al.

6. The electrode according to claim 1, wherein the active material-containing layer further comprises lithium titanium oxide having a spinel structure.

7. A secondary battery comprising:
   a positive electrode;
   a negative electrode; and
   an electrolyte,
   the negative electrode comprising the electrode according to claim 1.

8. The secondary battery according to claim 7, wherein the positive electrode comprises at least one selected from the group consisting of lithium nickel cobalt manganese composite oxide, lithium cobalt composite oxide, and lithium manganese nickel composite oxide.

9. A battery pack comprising the secondary battery according to claim 7.

10. The battery pack according to claim 9, further comprising an external power distribution terminal and a protective circuit.

11. The battery pack according to claim 9, comprising plural of the secondary battery, the secondary batteries being electrically connected in series, in parallel, or in combination of in-series connection and in-parallel connection.

12. A vehicle comprising the battery pack according to claim 9.

13. The vehicle according to claim 12, wherein the vehicle comprises a mechanism configured to convert kinetic energy of the vehicle into regenerative energy.

* * * * *